US012787032B2

(12) United States Patent
Ryu et al.

(10) Patent No.: US 12,787,032 B2
(45) Date of Patent: Nov. 3, 2026

(54) AUTOMATIC GAIN CONTROL SYMBOLS

(71) Applicant: QUALCOMM Incorporated, San Diego, CA (US)

(72) Inventors: Jae Ho Ryu, San Diego, CA (US); Gabi Sarkis, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 748 days.

(21) Appl. No.: 18/316,971

(22) Filed: May 12, 2023

(65) Prior Publication Data

US 2024/0381376 A1 Nov. 14, 2024

(51) Int. Cl.

*H04W 72/25* (2023.01)
*H04W 72/044* (2023.01)

(52) U.S. Cl.

CPC .......... *H04W 72/25* (2023.01); *H04W 72/044* (2013.01)

(58) Field of Classification Search

None
See application file for complete search history.

(56) References Cited

U.S. PATENT DOCUMENTS

2018/0249423 A1* 8/2018 Garcia ................. H04B 17/373
2021/0289410 A1* 9/2021 Dai ....................... H04W 36/18
2022/0149987 A1* 5/2022 Peng ..................... H04L 1/0013
2022/0407645 A1 12/2022 Wang et al.
2023/0084636 A1* 3/2023 Hosseini ............... H04L 5/0048 370/329
2023/0354221 A1* 11/2023 Han ....................... H04L 5/0048
2024/0129936 A1* 4/2024 Ganesan ............... H04W 72/23
2024/0205945 A1* 6/2024 Fouad ................... H04W 72/40
2025/0261161 A1* 8/2025 Zhang ............... H04W 72/0453
2025/0261216 A1* 8/2025 Park ....................... H04W 72/25
2025/0385772 A1* 12/2025 Zhao ...................... H04L 5/0051
2025/0386331 A1* 12/2025 Zhao ...................... H04L 5/0048
2026/0046900 A1* 2/2026 Lohr ...................... H04L 1/1896
2026/0136375 A1* 5/2026 Lee ....................... H04W 72/25

FOREIGN PATENT DOCUMENTS

CN 111130732 B 12/2021
CN 120712757 A * 9/2025 ........... G01S 7/0234
EP 3796733 A1 3/2021

OTHER PUBLICATIONS

International Search Report and Written Opinion—PCT/US2024/024751—ISA/EPO—Jul. 22, 2024.

* cited by examiner

*Primary Examiner* — Chirag G Shah
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a number of automatic gain control (AGC) symbols included in a sidelink slot structure for sidelink communication. The UE may receive a sidelink communication associated with a sidelink control information (SCI) field that indicates whether the number of AGC symbols are present within the sidelink communication. Numerous other aspects are described.

26 Claims, 19 Drawing Sheets

AUTOMATIC GAIN CONTROL SYMBOLS

FIELD OF THE DISCLOSURE

Aspects of the present disclosure generally relate to wireless communication and to techniques and apparatuses for automatic gain control symbols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. “Downlink” (or “DL”) refers to a communication link from the network node to the UE, and “uplink” (or “UL”) refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Automatic gain control (AGC) may be used by wireless communication devices to calibrate gain to improve reception of signaling. For example, a receiving device may measure a received power of a communication using one or more symbols of the communication and may identify an amount of gain to apply to remaining symbols of the communication. The receiving device may apply the gain based at least in part on application of power to a low noise amplifier (LNA) of a reception chain of the receiving device to amplify signals of the communication.

Various aspects relate generally to AGC for sidelink communications. Some aspects more specifically relate to communicating without AGC symbols. In some examples, a first user equipment (UE) and a second UE may communicate using first slots with AGC symbols and second slots without AGC symbols. In some aspects, locations (e.g., resource allocations and/or a slot configuration) of AGC symbols may be configured. The first UE and the second UE may communicate using the AGC symbols for AGC, or may dynamically or semi-statically select to communicate without AGC symbols. When the UEs are communicating without AGC symbols, the locations of AGC symbols may be used to carry data or other signaling. When the UEs are excluding AGC symbols, a transport block size may include the AGC symbols as data symbols or may exclude the AGC symbols.

Particular aspects of the subject matter described in this disclosure can be implemented to realize one or more of the following potential advantages. In some examples, by communicating without AGC, the described techniques can be used to improve spectral efficiency and/or throughput using network resources. For example, based at least in part on omitting AGC symbols (e.g., using resources that are configured as AGC symbols to carry other signals, such as data or reference signals), a transmitting device may transmit additional data in the communication and/or may reduce a modulation order for the communication to improve decoding and/or demodulating of the communication (e.g., to reduce communication errors and/or conserve resources associated with detecting and correcting communication errors).

Some aspects described herein relate to a method of wireless communication performed by a UE. The method may include receiving a configuration of a number (e.g., quantity) of AGC symbols included in a sidelink slot structure for sidelink communication. The method may include receiving a sidelink communication associated with a sidelink control information (SCI) field that indicates whether the number of AGC symbols are present within the sidelink communication.

Some aspects described herein relate to a method of wireless communication performed by a UE. The method may include receiving a configuration of a number of AGC symbols included in a sidelink slot structure for sidelink communication. The method may include transmitting a sidelink communication associated with an SCI field that indicates whether the number of AGC symbols are present within the sidelink communication.

Some aspects described herein relate to a UE for wireless communication. The UE may include one or more memories and one or more processors coupled to the one or more memories. The one or more processors may be configured to receive a configuration of a number of AGC symbols included in a sidelink slot structure for sidelink communication. The one or more processors may be configured to receive a sidelink communication associated with an SCI field that indicates whether the number of AGC symbols are present within the sidelink communication.

Some aspects described herein relate to a UE for wireless communication. The UE may include one or more memories and one or more processors coupled to the one or more memories. The one or more processors may be configured to receive a configuration of a number of AGC symbols included in a sidelink slot structure for sidelink communication. The one or more processors may be configured to transmit a sidelink communication associated with an SCI field that indicates whether the number of AGC symbols are present within the sidelink communication.

Some aspects described herein relate to a non-transitory computer-readable medium that stores a set of instructions for wireless communication by a UE. The set of instructions, when executed by one or more processors of the UE, may cause the UE to receive a configuration of a number of AGC symbols included in a sidelink slot structure for sidelink communication. The set of instructions, when executed by one or more processors of the UE, may cause the UE to receive a sidelink communication associated with an SCI field that indicates whether the number of AGC symbols are present within the sidelink communication.

Some aspects described herein relate to a non-transitory computer-readable medium that stores a set of instructions for wireless communication by a UE. The set of instructions, when executed by one or more processors of a UE, may cause the UE to receive a configuration of a number of AGC symbols included in a sidelink slot structure for sidelink communication. The set of instructions, when executed by one or more processors of the UE, may cause the UE to transmit a sidelink communication associated with an SCI field that indicates whether the number of AGC symbols are present within the sidelink communication.

Some aspects described herein relate to an apparatus for wireless communication. The apparatus may include means for receiving a configuration of a number of AGC symbols included in a sidelink slot structure for sidelink communication. The apparatus may include means for receiving a sidelink communication associated with an SCI field that indicates whether the number of AGC symbols are present within the sidelink communication.

Some aspects described herein relate to an apparatus for wireless communication. The apparatus may include means for receiving a configuration of a number of AGC symbols included in a sidelink slot structure for sidelink communication. The apparatus may include means for transmitting a sidelink communication associated with an SCI field that indicates whether the number of AGC symbols are present within the sidelink communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
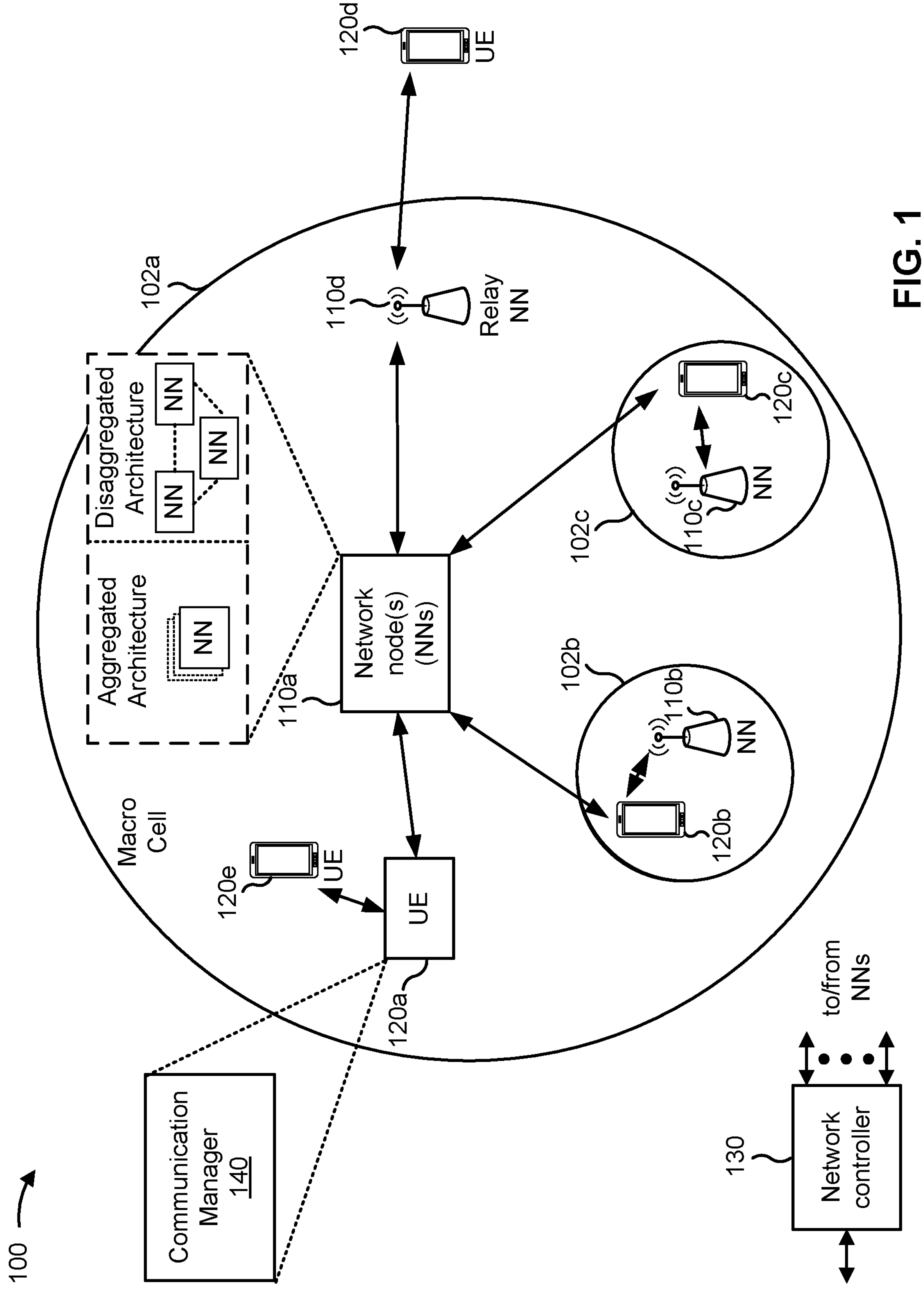
FIG. 1 is a diagram illustrating an example of a wireless network, in accordance with the present disclosure.

Automatic gain control (AGC) may be used by wireless communication devices to calibrate gain to improve reception of signaling. For example, a receiving device may measure a received power of a communication using one or more symbols of the communication and may identify an amount of gain to apply to remaining symbols of the communication. The receiving device may apply the gain based at least in part on application of power to a low noise amplifier (LNA) of a reception chain of the receiving device to amplify signals of the communication.

Various aspects relate generally to AGC for sidelink communications. Some aspects more specifically relate to communicating without AGC symbols. In some examples, a first UE and a second UE may communicate using first slots with AGC symbols and second slots without AGC symbols. In some aspects, locations (e.g., resource allocations and/or a slot configuration) of AGC symbols may be configured. The first UE and the second UE may communicate using the AGC symbols for AGC, or may dynamically or semi-statically select to communicate without AGC symbols. When the UEs are communicating without AGC symbols, the locations of AGC symbols may be used to carry data or other signaling. When the UEs are excluding AGC symbols, a transport block size may include the AGC symbols as data symbols or may exclude the AGC symbols.

Particular aspects of the subject matter described in this disclosure can be implemented to realize one or more of the following potential advantages. In some examples, by communicating without AGC, the described techniques can be used to improve spectral efficiency and/or throughput using network resources. For example, based at least in part on omitting AGC symbols (e.g., using resources that are configured as AGC symbols to carry other signals, such as data or reference signals), a transmitting device may transmit additional data in the communication and/or may reduce a modulation order for the communication to improve decoding and/or demodulating of the communication (e.g., to reduce communication errors and/or conserve resources associated with detecting and correcting communication errors).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrow-band IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FRI is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a number of AGC symbols included in a sidelink slot structure for sidelink communication; and receive a sidelink communication associated with a sidelink control information (SCI) field that indicates whether the number of AGC symbols are present within the sidelink communication. Additionally, or alternatively, the communication manager 140 may perform one or more other operations described herein.

In some aspects, the UE 120 may include a communication manager 140. As described in more detail elsewhere herein, the communication manager 140 may receive a configuration of a number of AGC symbols included in a sidelink slot structure for sidelink communication; and transmit a sidelink communication associated with an SCI field that indicates whether the number of AGC symbols are present within the sidelink communication. Additionally, or alternatively, the communication manager 140 may perform one or more other operations described herein.

As indicated above, FIG. 1 is provided as an example. Other examples may differ from what is described with regard to FIG. 1.

Figure 2:
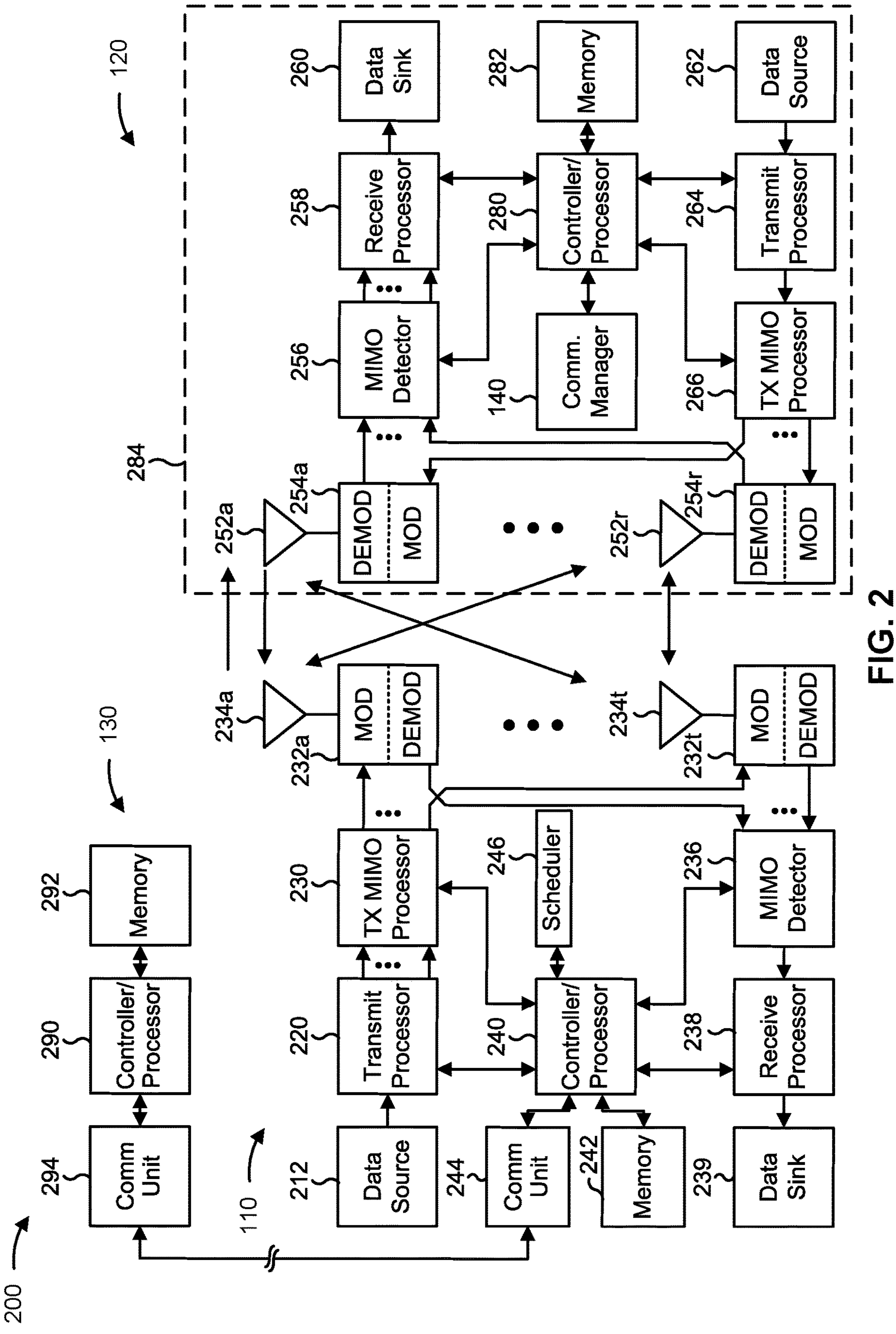
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate)

the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-19).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-19).

The controller/processor 240 of the network node 110, the controller/processor 280 of the UE 120, and/or any other component(s) of FIG. 2 may perform one or more techniques associated with AGC symbols, as described in more detail elsewhere herein. For example, the controller/processor 240 of the network node 110, the controller/processor 280 of the UE 120, and/or any other component(s) of FIG. 2 may perform or direct operations of, for example, process 1600 of FIG. 16, process 1700 of FIG. 17, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1600 of FIG. 16, process 1700 of FIG. 17, and/or other processes as described herein. In some examples, executing instructions may include running the instructions, converting the instructions, compiling the instructions, and/or interpreting the instructions, among other examples.

In some aspects, the UE 120 includes means for receiving a configuration of a number of AGC symbols included in a sidelink slot structure for sidelink communication (e.g., using antenna 252, modem 254, MIMO detector 256, receive processor 258, controller/processor 280, and/or memory 282, among other examples); and/or means for receiving a sidelink communication associated with an SCI field that indicates whether the number of AGC symbols are present within the sidelink communication (e.g., using antenna 252, modem 254, MIMO detector 256, receive processor 258, controller/processor 280, and/or memory 282, among other examples). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a configuration of a number of AGC symbols included in a sidelink slot structure for sidelink communication (e.g., using controller/processor 280, transmit processor 264, TX MIMO processor 266, modem 254, antenna 252, and/or memory 282, among other examples); and/or means for transmitting a sidelink communication associated with an SCI field that indicates whether the number of AGC symbols are present within the sidelink communication (e.g., using controller/processor 280, transmit processor 264, TX MIMO processor 266, modem 254, antenna 252, and/or memory 282, among other examples). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
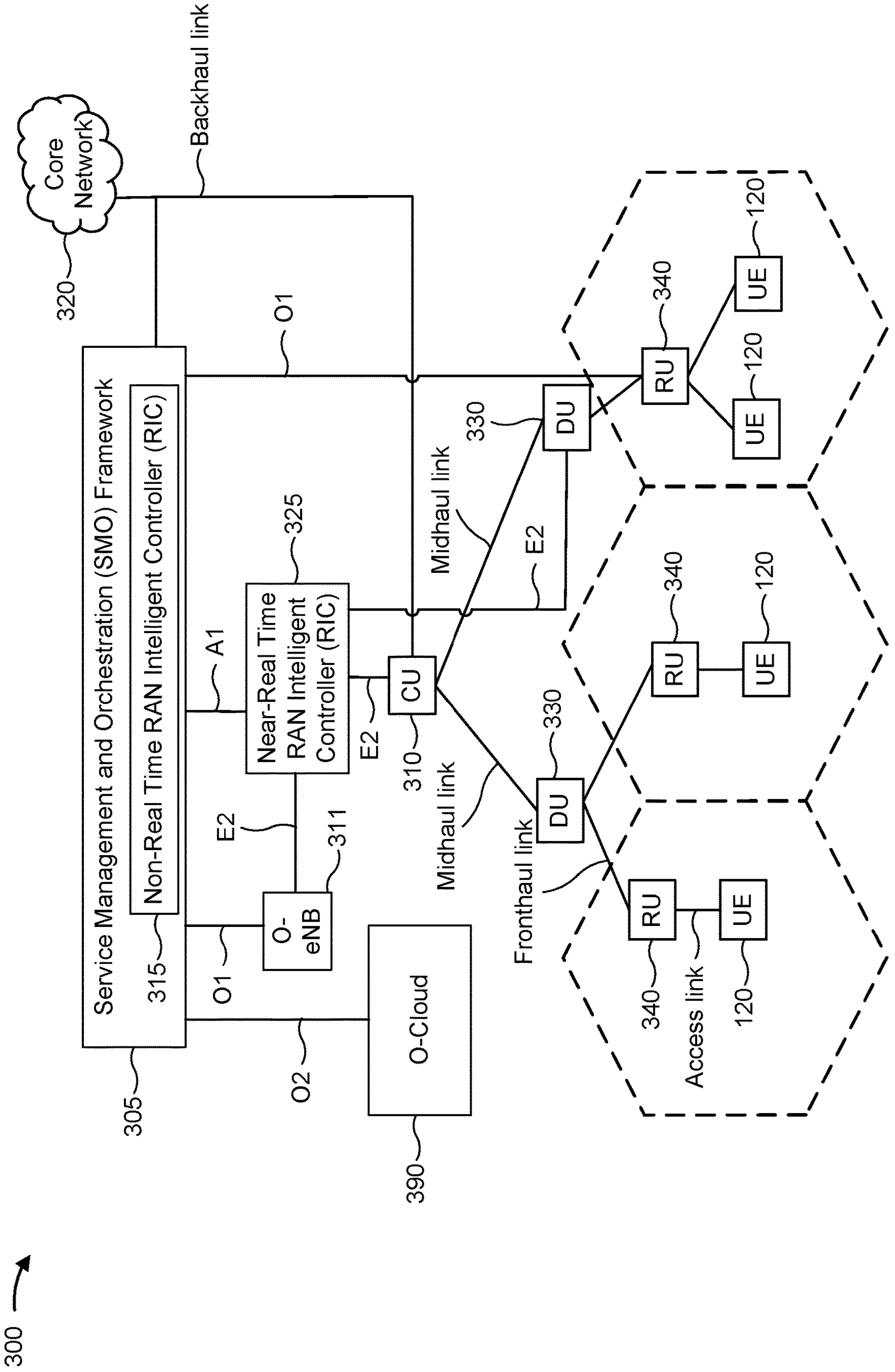
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
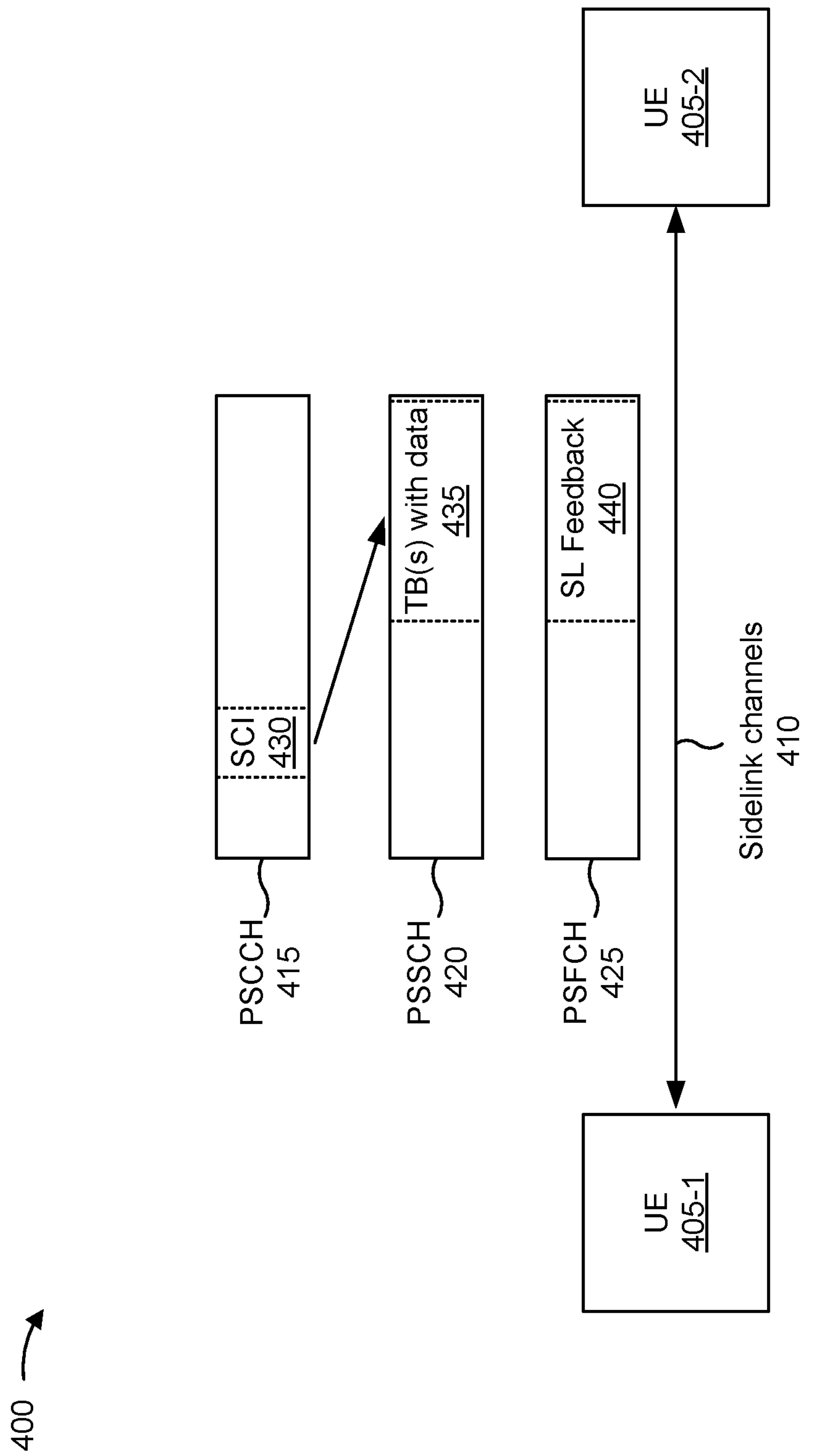
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in a RRC message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
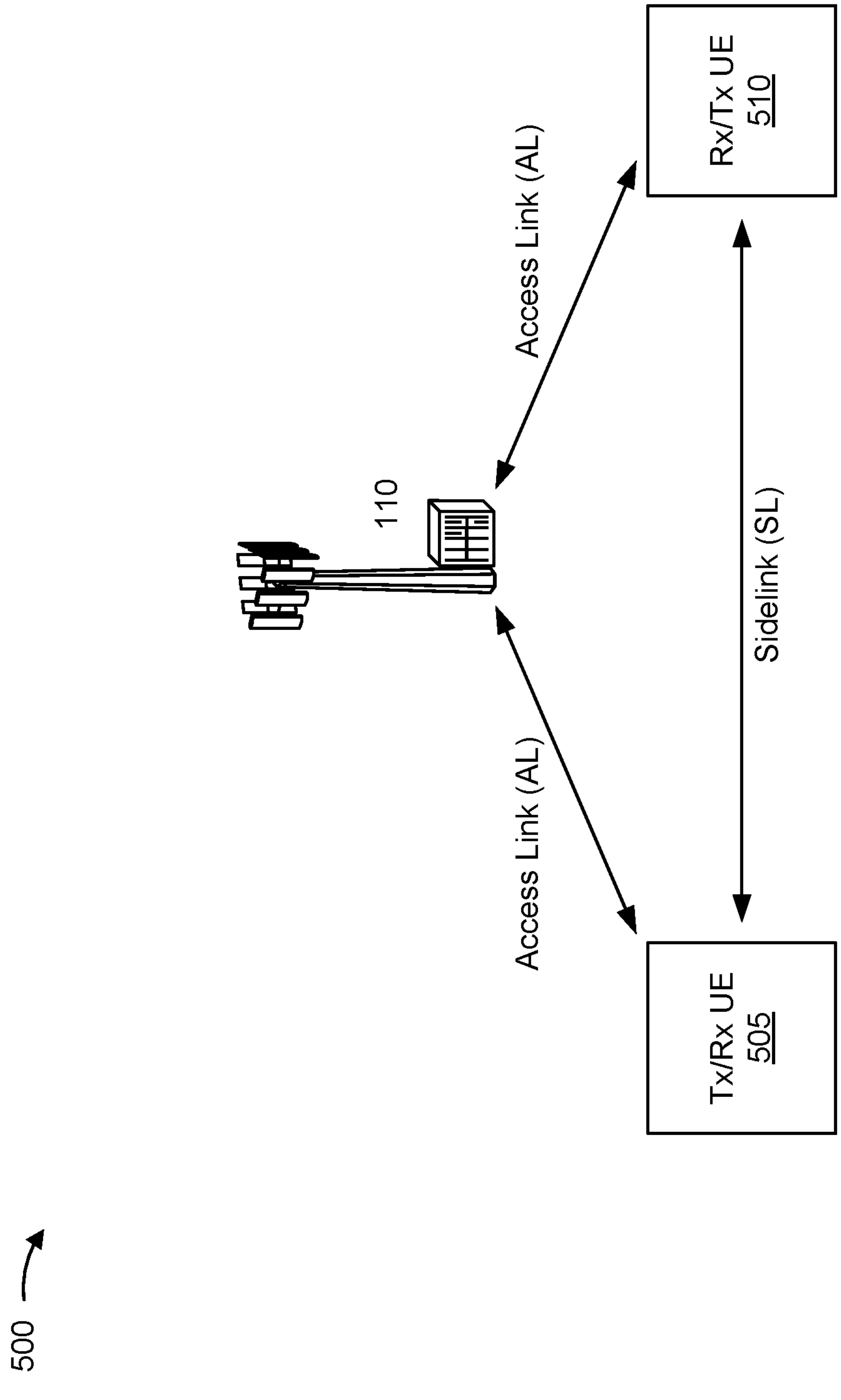
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
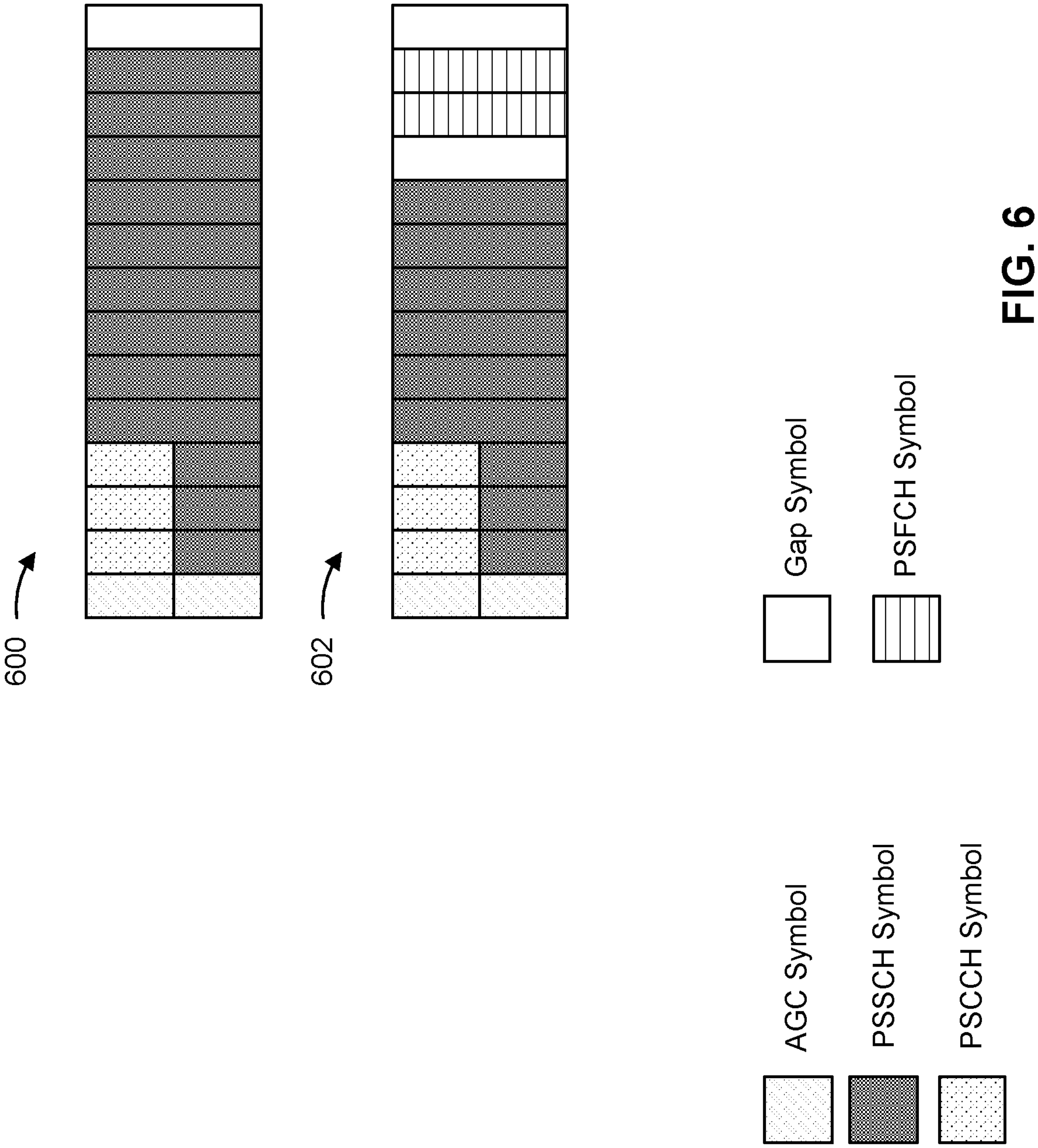
FIG. 6 is a diagram illustrating examples of a sidelink slot structure, in accordance with the present disclosure.

FIG. 6 is a diagram illustrating examples 600 and 602 of a sidelink slot structure, in accordance with the present disclosure. In example 600, the slot is shown as having 14 OFDM symbols. However, other numbers of OFDM symbols may be used.

As shown in FIG. 6, a first (in time) symbol of the slot is an AGC symbol. Within the AGC symbol, a transmitting device (e.g., a UE) may transmit a signal that is a repeat of a preceding symbol transmitted to a receiving device (e.g., a UE). As shown in FIG. 6, the slot includes PSCCH symbols on portions (e.g., in a frequency domain) of a set of symbols of the slot. The PSCCH symbols may be shared with a set of PSSCH symbols. The PSSCH symbols may further include additional symbols that are not shared with the PSCCH symbols. In some networks, PSCCH and PSSCH may always be included in a same slot.

A final symbol of the slot may include a gap symbol. The gap symbol may provide separation between slots, which may improve timing synchronization, tap coherence of communications between the transmitting device and the receiving device, and/or processing time between transmitting and receiving via a subsequent slot, among other examples.

As shown in example 602, the slot may include one or more PSFCH symbols. The PSFCH symbols may carry hybrid automatic repeat request (HARQ) acknowledgment (ACK) indications associated with the PSCCH, the PSSCH, or a previous communication. For example, the PSFCH may include an allocation for the receiving device to transmit an ACK associated with the PSCCH or PSSCH of the slot or a previous communication. Based at least in part on the PSFCH being associated with a change in communication direction (e.g., a change from the transmitting device transmitting to the receiving device to the receiving device transmitting to the transmitting device), the slot may allocate a gap symbol before the PSFCH.

In some networks, AGC may use one or two OFDM symbols in a slot. For example, for a single component carrier using an allocation of at least 10 resource blocks (RB), a receiving device may identify AGC within a time (e.g., an AGC settling time) of less than or equal to 35 microseconds for subcarrier spacing (SCS) of 15 kHz, less than or equal to 35 microseconds for SCS of 30 kHz, or less than or equal to 18 microseconds for SCS of 60 kHz.

As indicated above, FIG. 6 is provided as an example. Other examples may differ from what is described with regard to FIG. 6.

Figure 7:
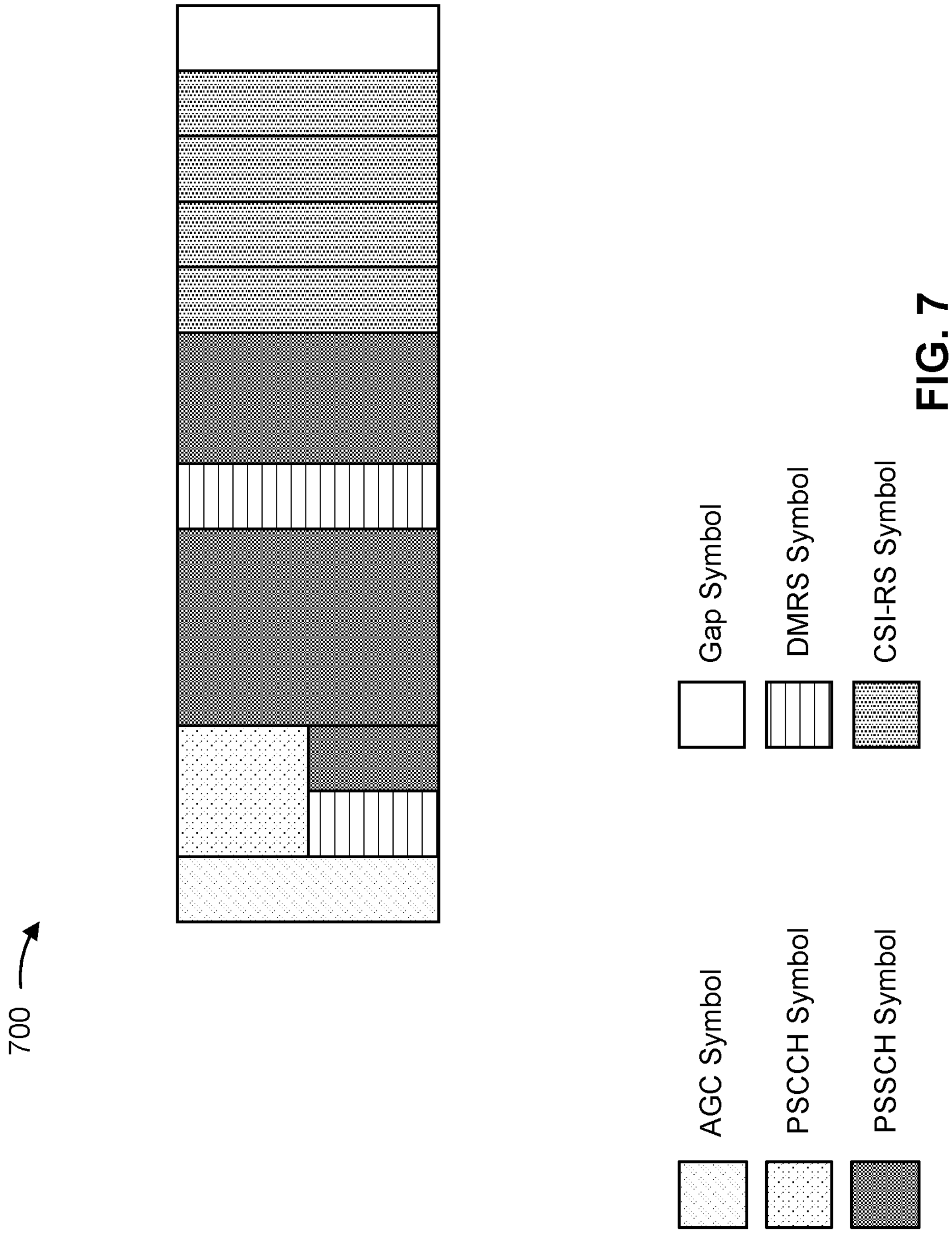
FIG. 7 is a diagram illustrating example of a sidelink slot structure, in accordance with the present disclosure.

FIG. 7 is a diagram illustrating example 700 of a sidelink slot structure, in accordance with the present disclosure. The slot of example 700 may include a channel state information reference signal (CSI-RS) or other slot used for beam management. In example 700, the slot is shown as having 14 OFDM symbols. However, other numbers of OFDM symbols may be used.

As shown in FIG. 7, a first (in time) symbol of the slot is an AGC symbol. As shown in FIG. 7, the slot includes PSCCH symbols on portions (e.g., in a frequency domain) of a set of symbols of the slot. The PSCCH symbols may be shared with a set of PSSCH symbols and a DMRS symbol. The PSSCH symbols may further include additional symbols that are not shared with the PSCCH symbols. One or more additional DMRS symbols may be included between PSSCH symbols. After the PSSCH symbols, the slot may include one or more CSI-RS symbols. A final symbol of the slot may include a gap symbol.

In some networks, a transmitting UE and a receiving UE may use the slot of example 700 to pair transmission and reception beams in a beam management procedure.

As indicated above, FIG. 7 is provided as an example. Other examples may differ from what is described with regard to FIG. 7.

In some networks, AGC control (e.g., fast AGC control) requires time for received signal energy measurement, AGC gain calculation based on received signal energy, gain control programming (e.g., LNA and/or analog gain stage, among other examples), and/or LNA and analog circuit convergence. Fast AGC may use approximately 30 microseconds, which may be completed within one OFDM symbol with 30 kHz SCS. For sidelink operation in FR2, one OFDM symbol duration may be 8.9 microseconds. In this case, fast AGC may be constrained to the 8.9 microseconds, which may be challenging or impractical for a receiving device.

However, in some cases, an AGC symbol may not be necessary for sidelink unicast communication in FR2 with periodic CSI-RS transmission for beam management.

In some aspects described herein, a transmitting UE and a receiving UE may communicate using a slot structure that includes two or three AGC symbols (e.g., for 120 KHz SCS). The slot structure may include the two or three AGC symbols for PSCCH or PSSCH in a slot without PSFCH. The structure may include the two or three AGC symbols for PSCCH or PSSCH and two or three additional AGC symbols for PSFCH in a slot with PSFCH. The slot structure may include the two or three AGC symbols for a sidelink synchronization signal block (S-SSB) slot. All AGC symbols may be repetitions of a first PSCCH or PSSCH symbol, PSFCH symbol, or first physical sidelink broadcast channel (PS-BCH) symbol.

In some aspects, a UE (e.g., the receiving device) may specify a capability for a minimum number of AGC symbols (e.g., minAGC-Symbols) for sidelink operation in FR2 with 120 KHz SCS. For example, the UE may transmit an indication (e.g., a report) of minAGC-Symbols to a network node associated with sidelink communication between the UE and an additional UE. The network node may configure a number of AGC symbols for sidelink communications (numAGC-Symbols) based at least in part on the UE capability for minAGC-Symbols. In some aspects, the network node May configure numAGC-Symbols=/when all associated sidelink UEs report minAGC-Symbols=1. In some aspects, a default value of numAGC-Symbols for the resource pool may be set to 2 if numAGC-Symbols is not configured for the resource pool. In some aspects, numAGC-Symbols may be configured for a sidelink BWP (e.g., with different values of the numAGC-Symbols allowed for different sidelink BWPs). numAGC-Symbols may be preconfigured to the UE for FR2 sidelink operation for an out-of-coverage scenario.

In some aspects, SCI1 and/or SCI2 decoding may be the same for PSCCH and PSSCH with and without AGC symbols. For example, PSCCH may be located in the same symbol and/or RBs irrespective of whether the AGC symbols are used or not. In some aspects, SCI2 location within a PSSCH resource is the same as if the PSCCH and/or PSSCH is transmitted with one or more AGC symbols. In some aspects, AGC symbols in a legacy slot structure may be used for PSSCH transmission. In some aspects, the slot structure may be dynamically switched between slots including AGC or omitting AGC.

In some aspects where no AGC symbols are used, the UE may use AGC window-based AGC operation. In some aspects, an AGC window may be configured for a sidelink BWP in FR2. The UE may be configured to transmit periodic CSI-RSs for beam management at least once in an AGC window. Within the AGC window, the UE may measure per-slot received signal strength indication (RSSI) over all sidelink slots to be monitored within the AGC window. The UE may determine an AGC gain based at least in part on an RSSI (e.g., a maximum RSSI) in a current AGC window. The UE may update an AGC gain for the next AGC window and maintain the same AGC gain during the next AGC window. In some aspects, the UE may detect poor performance or another condition that triggers the UE to request a change in a size of the AGC window to improve AGC estimation within AGC windows.

In some aspects, the UE may request the additional UE associated with the unicast connection to transmit PSCCH and/or PSSCH without an AGC symbol. For example, the UE may transmit the request based at least in part on support by the UE of reception of PSCCH and/or PSSCH without an AGC symbol and/or AGC window-based AGC updates that provide proper AGC settings. The UE may transmit the request via a new field in SCI2 or a sidelink MAC CE. The additional UE may transmit PSCCH and/or PSSCH without AGC symbols after transmitting an ACK associated with the request message.

In some aspects, the request may be valid for a limited time duration (e.g., 20 ms, among other examples) unless the UE transmits an additional request or update. In some aspects, the additional UE may fall back to a PSCCH and/or PSSCH transmission with AGC symbols after the validity duration. In some aspects, the validity duration may be configured by RRC for the resource pool and/or indicated along with the request from the UE.

In some aspects, the UE may receive the communication from the additional UE with an indication of whether AGC symbols are included in the communication. In some aspects, the additional UE may transmit the indication within a field of SCI1 or SCI 2 of the communication.

In some aspects, if a presence of AGC symbols is indicated by a new field in SCI2, the same time-domain DMRS pattern may be used for PSSCH with and without an AGC symbol. This may support decoding of the SCI2 with a legacy DMRS pattern assumption. In some aspects, the UE may determine whether the PSSCH is transmitted with or without the AGC symbol after SCI2 decoding.

In some aspects, if a presence of AGC symbols is indicated by a new field in SCI1, a new time-domain DMRS pattern may be specified for PSSCH without an AGC symbol. The UE may determine whether PSSCH is transmitted with or without an AGC symbol after SCI1 decoding. After SCI1 decoding, the UE may determine a time-domain DMRS pattern to be used for PSSCH DMRS channel estimation. In some aspects, the new DMRS pattern has the benefit of a uniform DMRS structure across DMRS symbols.

In some aspects, the UE decoding the PSCCH for a sensing purpose may use AGC symbols to enhance PSCCH decoding performance. When omission of an AGC symbol is enabled in a sidelink BWP, the UE may not use AGC symbols for PSCCH decoding. In some aspects, a transport block size (TBS) determination for PSSCH without AGC symbol may be based at least in part on a number of resource elements (REs) including tones in a legacy AGC symbol or may be based at least in part on a number of REs without including tones in the legacy AGC symbol.

Based at least in part on communicating without AGC symbols, the described techniques can be used to improve spectral efficiency and/or throughput using network resources. For example, based at least in part on omitting AGC symbols (e.g., using resources that are configured as AGC symbols to carry other signals, such as data or reference signals), a UE may transmit additional data in the communication and/or May reduce a modulation order for the communication to improve decoding and/or demodulating of the communication. In this way, the UE and/or an additional UE that receives the communication may reduce communication errors and/or conserve resources associated with detecting and correcting communication errors.

Figure 8:
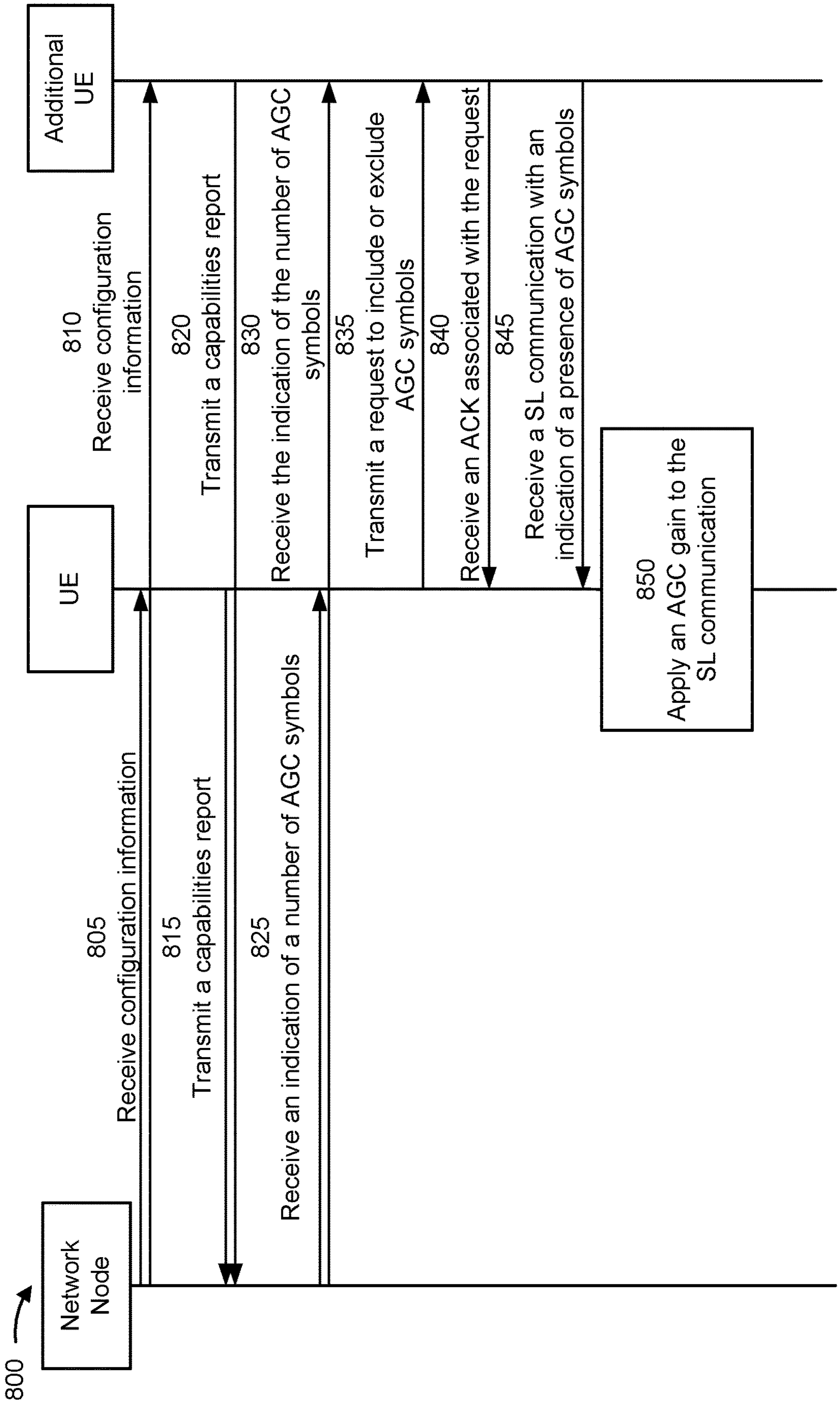
FIG. 8 is a diagram of an example associated with automatic gain control (AGC) symbols, in accordance with the present disclosure.

FIG. 8 is a diagram of an example 800 associated with AGC symbols, in accordance with the present disclosure. As shown in FIG. 8, a network node (e.g., network node 110, a CU, a DU, and/or an RU), a UE (e.g., UE 120), and an additional UE (e.g., UE 120) may communicate. In some aspects, the network node, the UE and the additional UE may be part of a wireless network (e.g., wireless network 100). The UE and the additional UE may have established a wireless connection (e.g., a sidelink connection) and the network node may have established wireless connections with one or more of the UE or the additional UE prior to operations shown in FIG. 8.

As shown by reference number 805, the network node may transmit, and the UE may receive, configuration information. In some aspects, the UE may receive the configuration information via one or more of RRC signaling, one or more medium access control (MAC) control elements (CEs), and/or downlink control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to communicate with one or more additional UEs via a sidelink connection based at least in part on the configuration information. In some aspects, the configuration information may indicate one or more parameters for using AGC symbols in sidelink communications. In some aspects, the configuration information may indicate that the UE is to transmit an indication of support for a number of AGC symbols within sidelink communications. For example, the configuration information may indicate that the UE is to transmit an indication of support for one or two AGC symbols for sidelink communications. In some aspects, the configuration information may indicate that the UE is to transmit an indication of whether the UE supports omission of AGC symbols in sidelink communications.

The UE may configure itself based at least in part on the configuration information. In some aspects, the UE may be configured to perform one or more operations described herein based at least in part on the configuration information.

As shown by reference number 810, the additional UE may receive, and the network node may transmit, the configuration information. In some aspects, the configuration information may be the same as or similar to the configuration information described in connection with reference number 805.

As shown by reference number 815, the UE may transmit, and the network node may receive, a capabilities report. In some aspects, the capabilities report may indicate a number of AGC symbols in sidelink communications and/or UE support for the number of AGC symbols in the sidelink communications. For example, the UE may indicate a minimum number of AGC symbols to perform AGC settling. In some aspects, the minimum number of AGC symbols may include one symbol or more than one symbol. In some aspects, the UE may indicate support for omission of AGC symbols.

As shown by reference number 820, the additional UE may transmit, and the network node may receive, a capabilities report. Similar to the capabilities report described in connection with reference number 815, the capabilities report may indicate a number of AGC symbols in sidelink communications and/or additional UE support for the number of AGC symbols in the sidelink communications. For example, the additional UE may indicate a minimum number of AGC symbols to perform AGC settling. In some aspects, the minimum number of symbols may include one symbol or more than one symbol. In some aspects, the additional UE may indicate support for omission of AGC symbols.

As shown by reference number 825, the UE may receive, and the network node may transmit, an indication of a number of AGC symbols to use for sidelink communications. In some aspects, the indication may include a configuration message (e.g., RRC) or an activation of a previously indicated configuration. For example, the UE may receive the indication as a configuration of a number of AGC symbols included in one or more slots for communication. Additionally, or alternatively, the UE may receive the configuration as a pre-configuration (e.g., a configuration received while in range of the network node for use when outside of the range of the network node).

In some aspects, the configuration of the number of AGC symbols is associated with a bandwidth part (BWP) and/or a set of slots that includes resources for the sidelink communication, among other examples.

As shown by reference number 830, the additional UE may receive, and the network node may transmit, an indication of a number of AGC symbols to use for sidelink communications. In some aspects, the indication of the AGC symbols may be the same for the UE and the additional UE.

As shown by reference number 835, the UE may transmit, and the additional UE may receive, a request to include or exclude AGC symbols. For example, the UE may detect a condition that allows the UE to identify AGC without using AGC symbols within communications transmitted by the additional UE. In this case, the UE and the additional UE may communicate with less overhead and more throughput.

In some aspects, the request may be associated with a validity duration during which the UE supports an omission of AGC symbols. In some aspects, the validity has a value (e.g., length of time) that is based at least in part on a configuration, a communication protocol, an indication from the UE, and/or an indication from the additional UE.

As shown by reference number 840, the UE may receive, and the additional UE may transmit, an ACK associated with the request. In some aspects, the UE may not attempt to identify an omission of AGC symbols without receiving the ACK from the additional UE.

As shown by reference number 845, the UE may receive, and the additional UE may transmit, a sidelink (SL) communication with an indication of a presence of AGC symbols. For example, the UE may receive the sidelink communication with a dynamic indication of a presence of AGC symbols within the sidelink communication.

In some aspects, the UE may receive the dynamic indication via a first SCI or a second SCI within the sidelink communication. In some aspects, a time-domain DMRS pattern of the sidelink communication may be independent from the indication of the presence of the AGC symbols via the second SCI. Alternatively, the indication of the time-domain DMRS pattern of the sidelink communication may be dynamic and based at least in part on the presence of the AGC symbols via the first SCI.

In some aspects, the indication may indicate that the AGC symbols are not present (e.g., symbols configured for AGC are not used for AGC). In some aspects, the AGC symbols may be used for data (e.g., PSSCH). In this case, a transport block size of the sidelink communication may be based at least in part on symbols available for data including one or more symbols that are configured for AGC. Alternatively, the transport block size of the sidelink communication may be based at least in part on symbols available for data excluding one or more symbols that are configured for AGC. When the transport block size is based at least in part on including the symbols configured for AGC, the transport block size may be greater than otherwise. When excluding the symbols configured for AGC, the communication may have a reduced coding rate.

In some aspects, the AGC symbols (e.g., AGC symbols configured or allocated for AGC) may be used as AGC symbols, data symbols, or reference signals (e.g., DMRSs).

In some aspects, the AGC symbols may be located before a PSCCH symbol and/or before a PSFCH portion of the communication.

As shown by reference number 850, the UE may apply an AGC gain to the sidelink communication. In some aspects, the AGC may be based at least in part on measurement of an AGC symbol within the communication.

When an AGC symbol is not present in the communication (or a symbol configured for ACG is used for other signaling), the UE may use an AGC window to identify an AGC to apply to the communication. For example, the UE may measure received signal strengths during a window of time and identify the AGC gain to apply. The UE may use the AGC gain during a subsequent window until the UE updates the AGC gain based at least in part on measuring the received signal strengths during the subsequent window.

Based at least in part on communicating without AGC symbols, the described techniques can be used to improve spectral efficiency and/or throughput using network resources. For example, based at least in part on omitting AGC symbols (e.g., using resources that are configured for AGC symbols to carry other signals, such as data or reference signals), a UE may transmit additional data in the communication and/or may reduce a modulation order for the communication to improve decoding and/or demodulating of the communication. In this way, the UE and/or an additional UE that receives the communication may reduce communication errors and/or conserve resources associated with detecting and correcting communication errors.

As indicated above, FIG. 8 is provided as an example. Other examples may differ from what is described with respect to FIG. 8.

Figure 9:
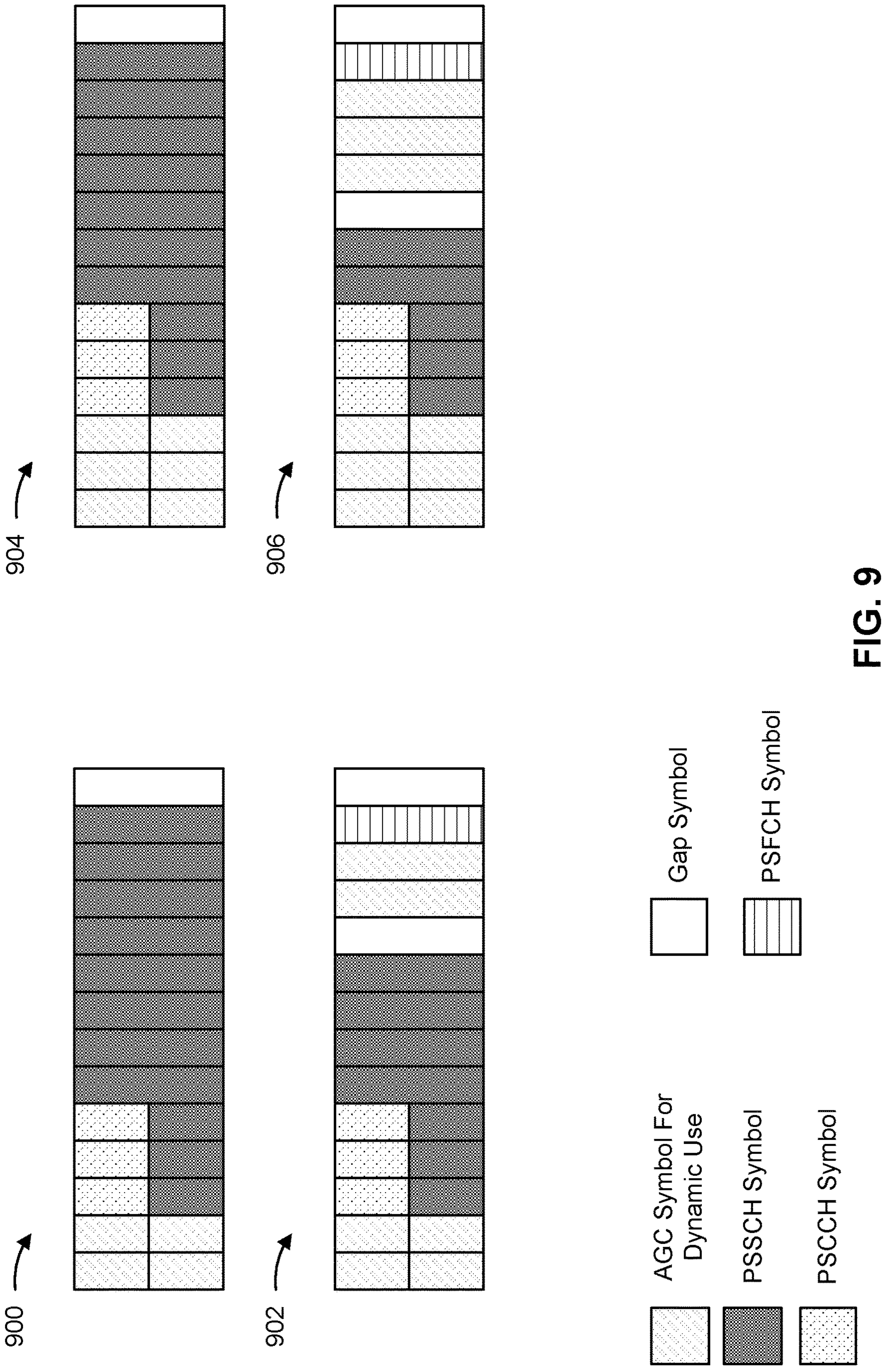
FIG. 9 is a diagram illustrating examples of a sidelink slot structure, in accordance with the present disclosure.

FIG. 9 is a diagram illustrating examples 900, 902, 904, and 906 of a sidelink slot structure, in accordance with the present disclosure. In example 900, the slot is shown as having 14 OFDM symbols. However, other numbers of OFDM symbols may be used.

As shown in FIG. 9, a first two (in time) symbols of the slot are AGC symbols for dynamic use (they may be used for AGC or other signaling, if dynamically indicated). As shown in FIG. 9, the slot includes PSCCH symbols on portions (e.g., in a frequency domain) of a set of symbols of the slot. The PSCCH symbols may be shared with a set of PSSCH symbols. The PSSCH symbols may further include additional symbols that are not shared with the PSCCH symbols. In some networks, PSCCH and PSSCH may always be included in a same slot. A final symbol of the slot may include a gap symbol.

As shown in example 902, the slot may include one or more PSFCH symbols that may carry HARQ ACK indications associated with the PSCCH, the PSSCH, or a previous communication. For example, the PSFCH may include an allocation for the receiving device to transmit an ACK associated with the PSCCH or PSSCH of the slot or a previous communication. Based at least in part on the PSFCH being associated with a change in communication direction (e.g., a change from the transmitting device transmitting to the receiving device to the receiving device transmitting to the transmitting device), the slot may allocate a gap symbol before the PSFCH.

Examples 904 and 906 illustrate examples where the slot includes three AGC symbols. When used for AGC, the slot may have a high proportion of overhead for AGC, which may be avoided when the UE and the additional UE support omission of AGC symbols and the AGC symbols may instead be used for data, control information, and/or reference signals.

As indicated above, FIG. 9 is provided as an example. Other examples may differ from what is described with regard to FIG. 9.

Figure 10:
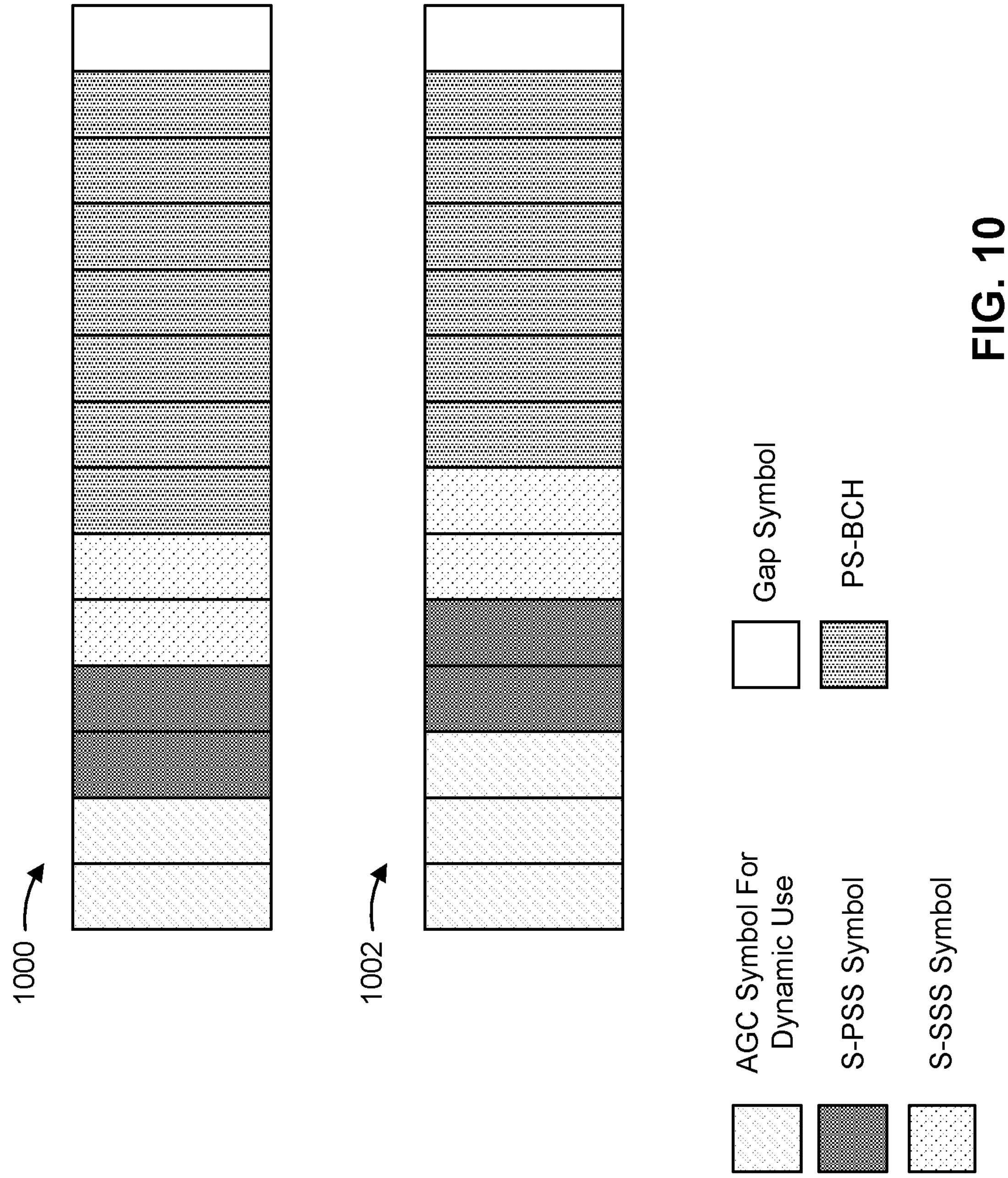
FIG. 10 is a diagram illustrating examples of sidelink slot structures, in accordance with the present disclosure.

FIG. 10 is a diagram illustrating examples 1000 and 1002 of sidelink slot structures, in accordance with the present disclosure. The slots of FIG. 10 may include a CSI-RS or other slot used for beam management. In examples 1000 and 1002, the slot is shown as having 14 OFDM symbols. However, other numbers of OFDM symbols may be used.

As shown in examples 1000 and 1002, a set of first (in time) symbols of the slot is AGC symbols. As shown examples 1000 and 1002, the slot includes sidelink primary synchronization signals (S-PSS) symbols, sidelink secondary synchronization signals (S-SSS) symbols, one or more gap symbols, and/or one or more physical sidelink broadcast channel (PS-BCH) symbols. As shown, example 1000 includes two AGC symbols and example 1002 includes three AGC symbols.

As indicated above, FIG. 10 is provided as an example. Other examples may differ from what is described with regard to FIG. 10.

Figure 11:
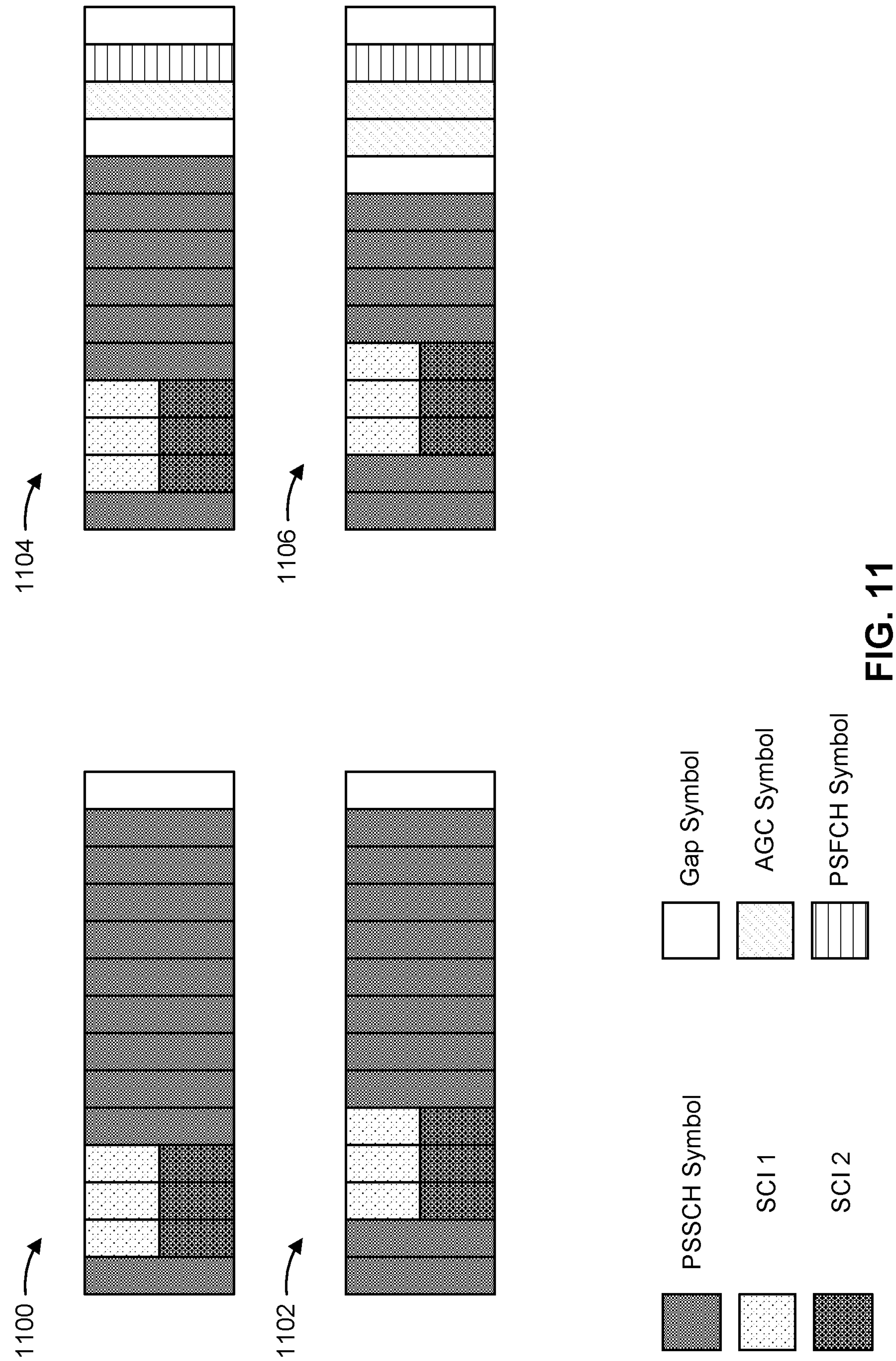
FIG. 11 is a diagram illustrating examples of a sidelink slot structure, in accordance with the present disclosure.

FIG. 11 is a diagram illustrating examples 1100, 1102, 1104, and 1106 of a sidelink slot structure, in accordance with the present disclosure. In FIG. 11, the slot is shown as having 14 OFDM symbols. However, other numbers of OFDM symbols may be used.

As shown in FIG. 11, a first (in time) set of symbols of the slot are AGC symbols for dynamic use that have been allocated for a PSSCH. As shown in FIG. 11, the slot includes PSCCH symbols on portions (e.g., in a frequency domain) of a set of symbols of the slot. The PSCCH symbols may be shared with a set of PSSCH symbols. The PSSCH symbols may further include additional symbols that are not shared with the PSCCH symbols. In some networks, PSCCH and PSSCH may always be included in a same slot. A final symbol of the slot may include a gap symbol.

As shown in examples 1104 and 1106, the slot may include one or more PSFCH symbols that may carry HARQ ACK indications associated with the PSCCH, the PSSCH, or a previous communication. For example, the PSFCH may include an allocation for the receiving device to transmit an ACK associated with the PSCCH or PSSCH of the slot or a previous communication. Based at least in part on the PSFCH being associated with a change in communication direction (e.g., a change from the transmitting device transmitting to the receiving device to the receiving device transmitting to the transmitting device), the slot may allocate a gap symbol before the PSFCH.

Examples 1102 and 1106 illustrate examples where the slot includes two AGC symbols that are allocated for PSSCH. When used for AGC, the slot may have a high proportion of overhead for AGC, which may be avoided when the UE and the additional UE support omission of AGC symbols and the AGC symbols may instead be used for data, control information, and/or reference signals.

As indicated above, FIG. 11 is provided as an example. Other examples may differ from what is described with regard to FIG. 11.

Figure 12:
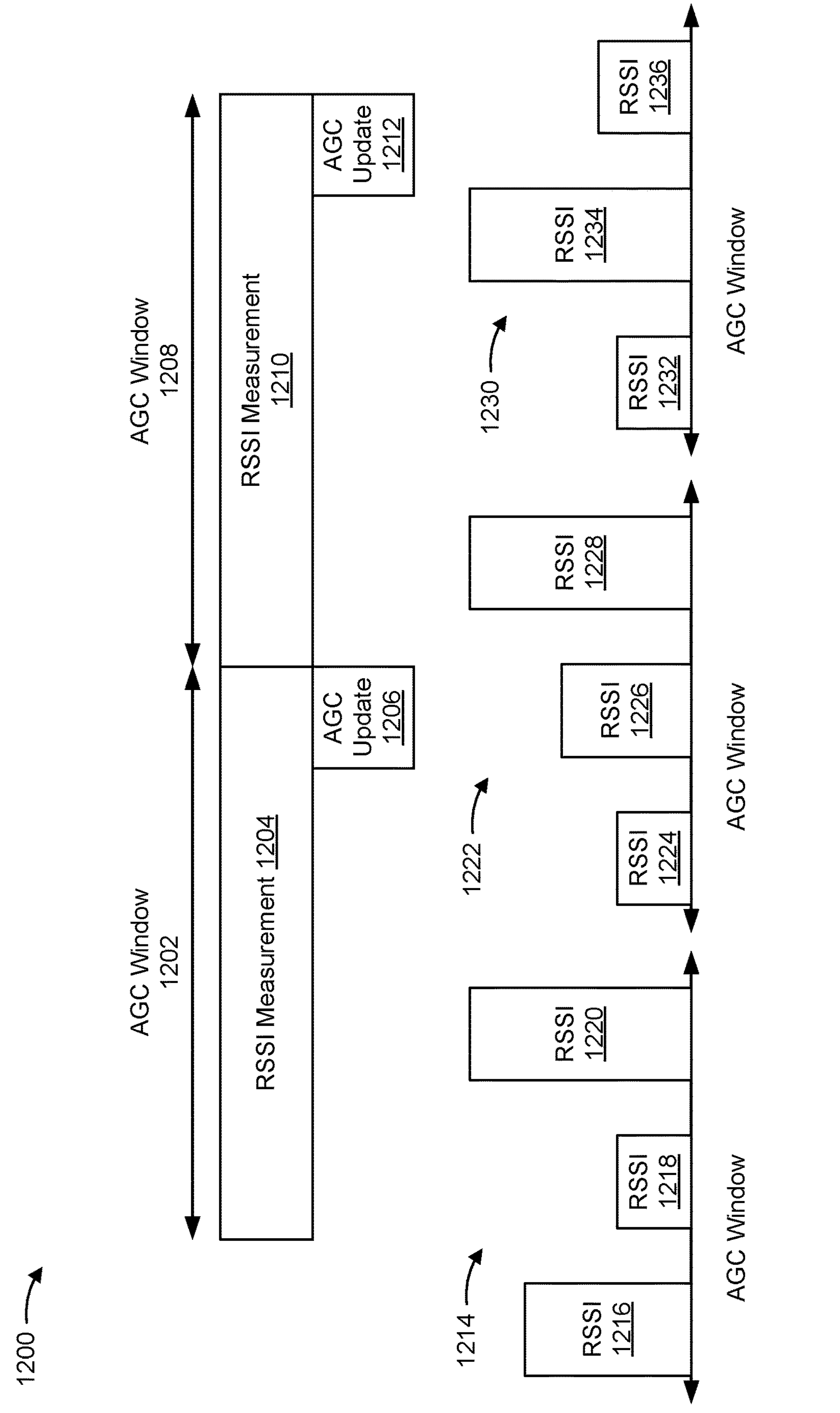
FIG. 12 is a diagram illustrating example of AGC windows, in accordance with the present disclosure.

FIG. 12 is a diagram illustrating example 1200 of AGC windows, in accordance with the present disclosure. As shown in FIG. 12, an AGC window 1202 may be associated with multiple slots for sidelink communication and may include RSSI measurement 1204 during the AGC window. Near the end of the AGC window 1202, a UE may perform an AGC update 1206. An AGC window 1208 may include RSSI measurement 1210 during the AGC window. Near the end of the AGC window 1208, the UE may perform an AGC update 1212.

As shown by reference number 1214, a UE may measure RSSI within an AGC window with RSSI 1216, RSSI 1218, and RSSI 1220. As shown by reference number 1222, a UE may measure RSSI within an AGC window with RSSI 1224, RSSI 1226, and RSSI 1228. As shown by reference number 1230, a UE may measure RSSI within an AGC window with RSSI 1232, RSSI 1234, and RSSI 1236. In some aspects, when RSSI measurements are within a threshold range, the UE may use the measurements of RSSI to identify and update AGC without using AGC symbols. However, when RSSI measurements fail to satisfy the threshold range, the AGC may fail. Based at least in part on AGC being inaccurate without AGC symbols, the UE may transmit a request to include AGC symbols in subsequent communications.

As indicated above, FIG. 12 is provided as an example. Other examples may differ from what is described with regard to FIG. 12.

Figure 13:
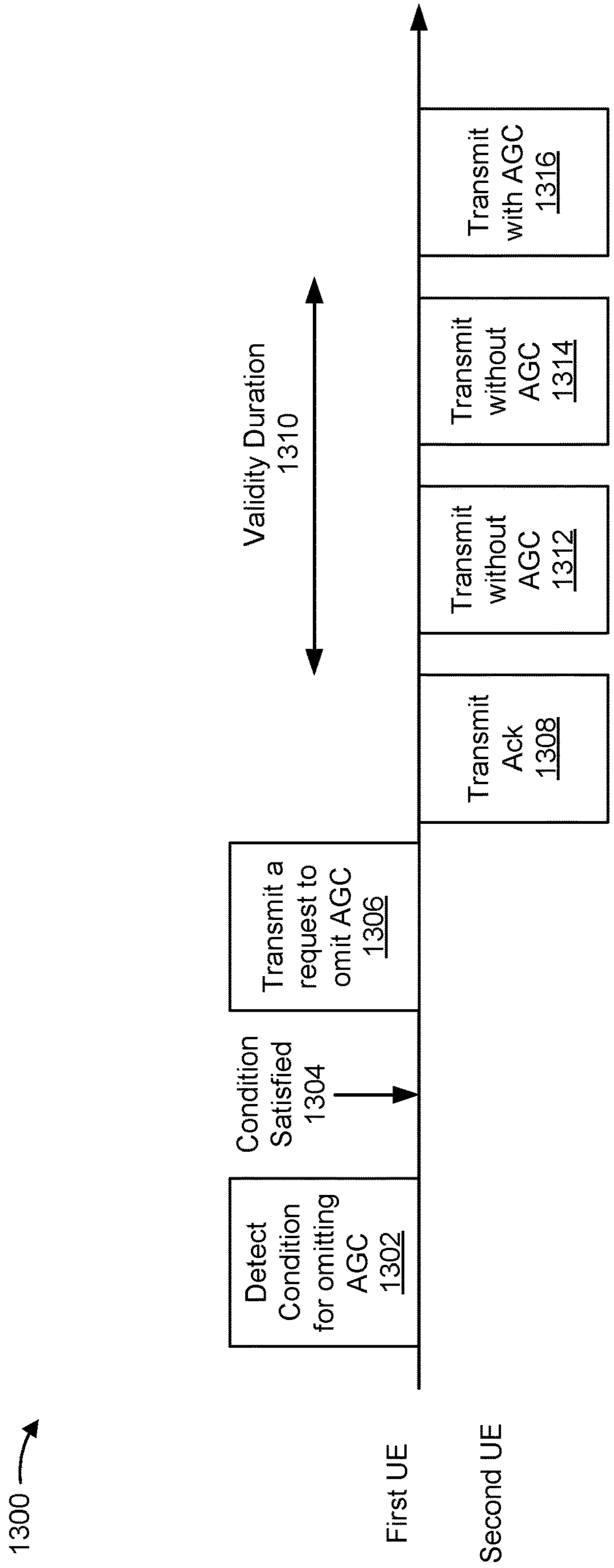
FIG. 13 is a diagram illustrating example of sidelink communications without AGC symbols, in accordance with the present disclosure.

FIG. 13 is a diagram illustrating example 1300 of sidelink communications without AGC symbols, in accordance with the present disclosure. As shown in FIG. 13, a first UE and a second UE may communicate via a sidelink connection.

As shown by reference number 1302, the first UE may detect a condition for omitting AGC. For example, the first UE may receive a configuration of the condition for omitting AGC, such as consistency of RSSI measurements that support AGC window-based AGC settling.

As shown by reference number 1304, the first UE may detect that the condition is satisfied. For example, the UE may detect that RSSI measurements have a consistency that satisfies a threshold. For example, a number of RSSI measurements may have a difference that satisfies a threshold.

As shown by reference number 1306, the first UE may transmit a request to omit AGC symbols from communications transmitted by the second UE to the first UE. As shown by reference number 1308, the second UE may transmit an ACK associated with the request.

As shown by reference number 1310, the request may be valid for a validity duration. The validity duration may begin at a time of transmission of the ACK or transmission of the request.

As shown by reference numbers 1312 and 1314, the second UE may transmit a communication without AGC symbols. For example, the second UE may use resources configured for AGC symbols to carry data, control information, and/or reference signals.

As shown by reference number 1316, the second UE may transmit a communication with one or more AGC symbols based at least in part on the validity duration expiring before a time of transmission of the communication.

As indicated above, FIG. 13 is provided as an example. Other examples may differ from what is described with regard to FIG. 13.

Figure 14:
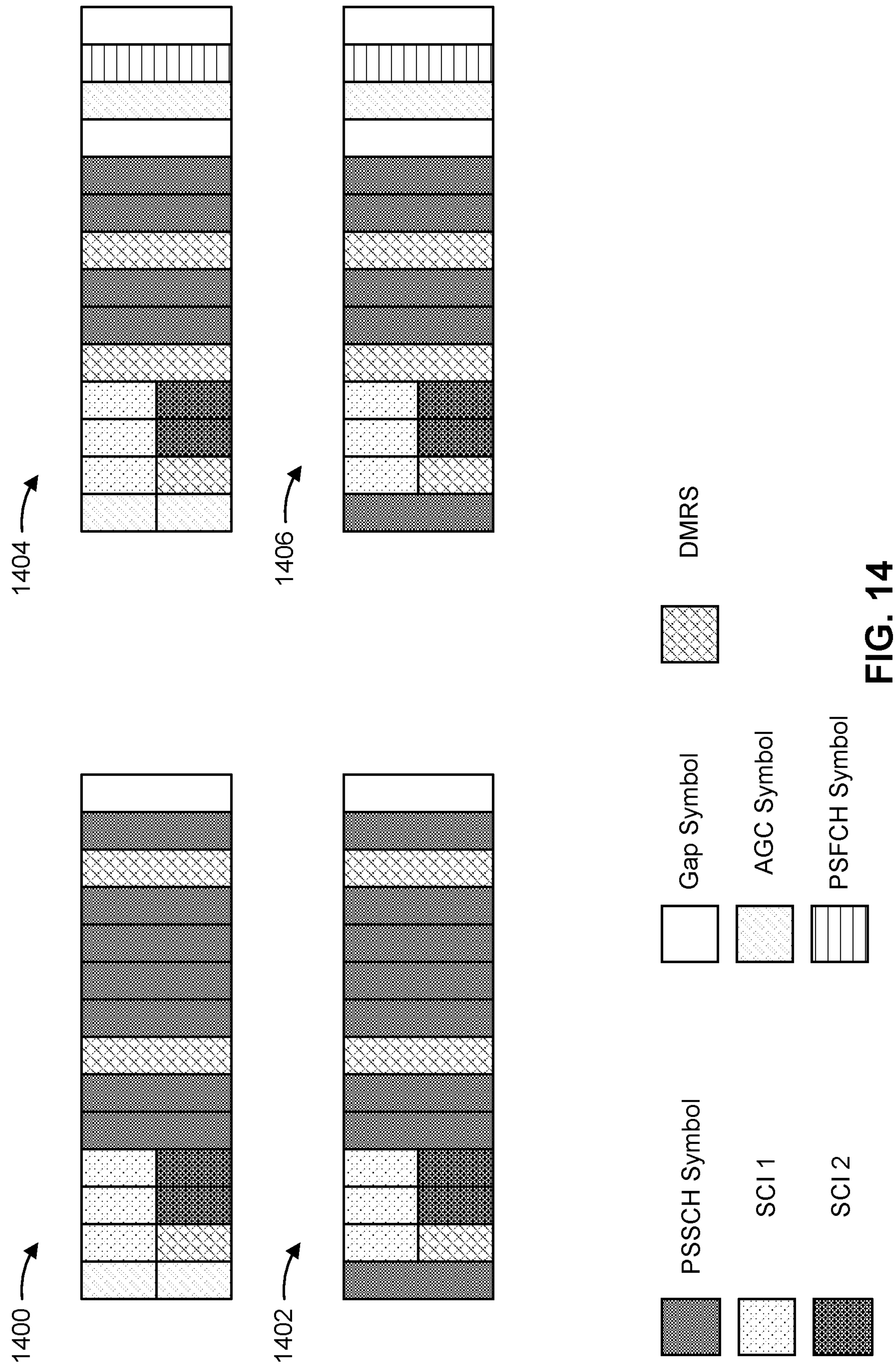
FIG. 14 is a diagram illustrating examples of a sidelink slot structure, in accordance with the present disclosure.

FIG. 14 is a diagram illustrating examples 1400, 1402, 1404, and 1406 of a sidelink slot structure, in accordance with the present disclosure. In FIG. 14, the slot is shown as having 14 OFDM symbols. However, other numbers of OFDM symbols may be used.

As shown in examples 1400 and 1404, a first (in time) set of symbols of the slot are AGC symbols for dynamic use that have been allocated for AGC. As shown in FIG. 14, the slot includes PSCCH symbols on portions (e.g., in a frequency domain) of a set of symbols of the slot. The PSCCH symbols may be shared with a set of PSSCH symbols. The PSSCH symbols may further include additional symbols that are not shared with the PSCCH symbols. In some aspects, the slots may include one or more DMRS symbols within the slots. In some networks, PSCCH and PSSCH may always be included in a same slot. A final symbol of the slot may include a gap symbol.

As shown in examples 1402 and 1406, the first set of symbols are allocated for PSSCH instead of AGC. As shown in examples 1402 and 1406, the DMRS symbols may have a same time-domain pattern as examples 1400 and 1404 when the AGC symbols are allocated to the PSSCH. In this way, the UE may know locations of the DMRS symbols irrespective of whether or not the slot includes AGC symbols.

As indicated above, FIG. 14 is provided as an example. Other examples may differ from what is described with regard to FIG. 14.

Figure 15:
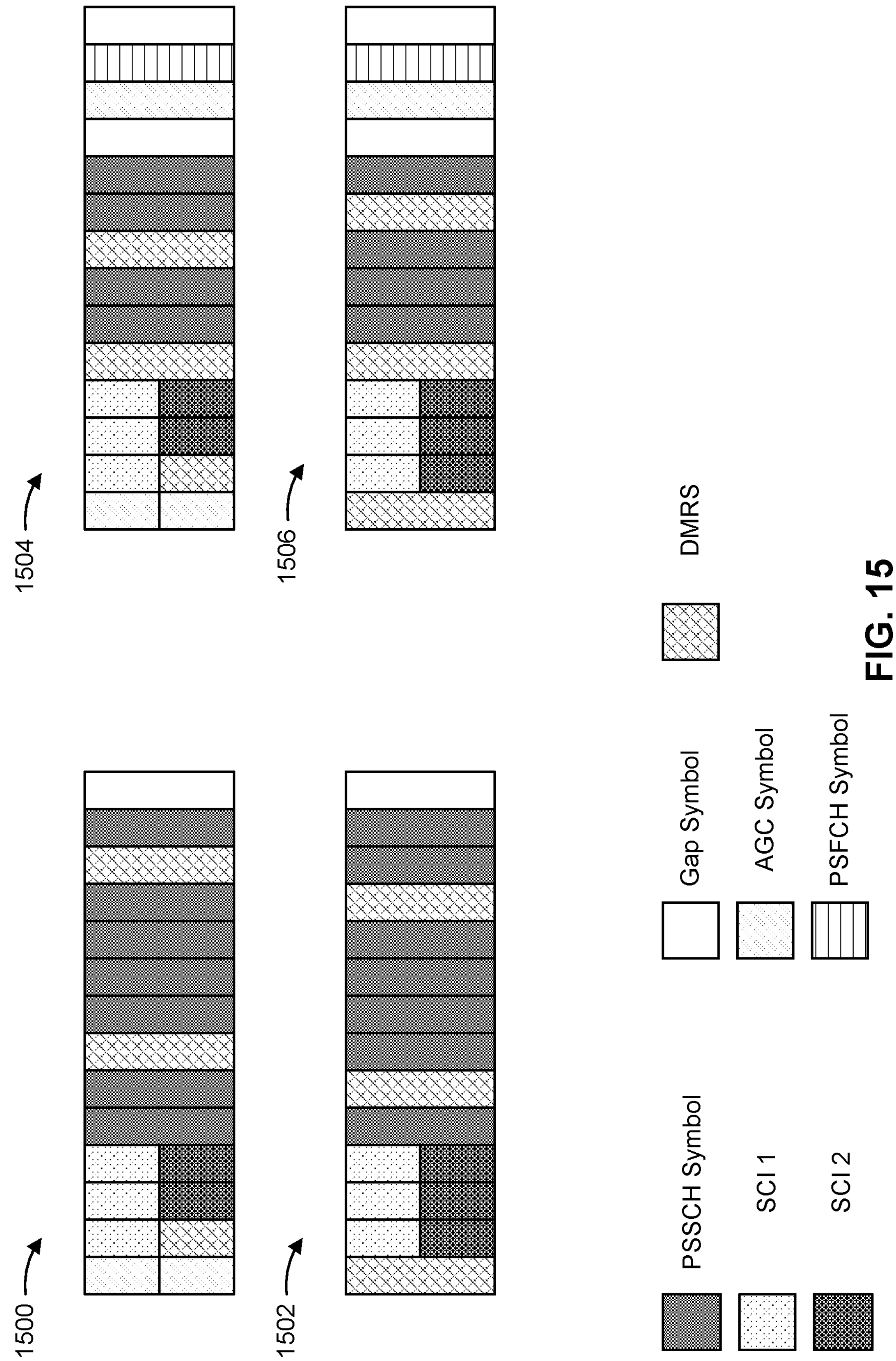
FIG. 15 is a diagram illustrating examples of a sidelink slot structure, in accordance with the present disclosure.

FIG. 15 is a diagram illustrating examples 1500, 1502, 1504, and 1506 of a sidelink slot structure, in accordance with the present disclosure. In FIG. 15, the slot is shown as having 14 OFDM symbols. However, other numbers of OFDM symbols may be used.

As shown in examples 1500 and 1504, a first (in time) set of symbols of the slot are AGC symbols for dynamic use that have been allocated for AGC. As shown in FIG. 15, the slot includes PSCCH symbols on portions (e.g., in a frequency domain) of a set of symbols of the slot. The PSCCH symbols may be shared with a set of PSSCH symbols. The PSSCH symbols may further include additional symbols that are not shared with the PSCCH symbols. In some aspects, the slots may include one or more DMRS symbols within the slots. In some networks, PSCCH and PSSCH may always be included in a same slot. A final symbol of the slot may include a gap symbol.

As shown in examples 1502 and 1506, the first set of symbols are allocated for DMRSs instead of AGC. As shown in examples 1502 and 1506 (and in contrast to examples 1402 and 1406 of FIG. 14), the DMRS symbols may have a different time-domain pattern from examples 1500 and 1504 when the AGC symbols are allocated to the PSSCH. In this way, the DMRSs may have improved distribution among PSSCH symbols.

As indicated above, FIG. 15 is provided as an example. Other examples may differ from what is described with regard to FIG. 15.

Figure 16:
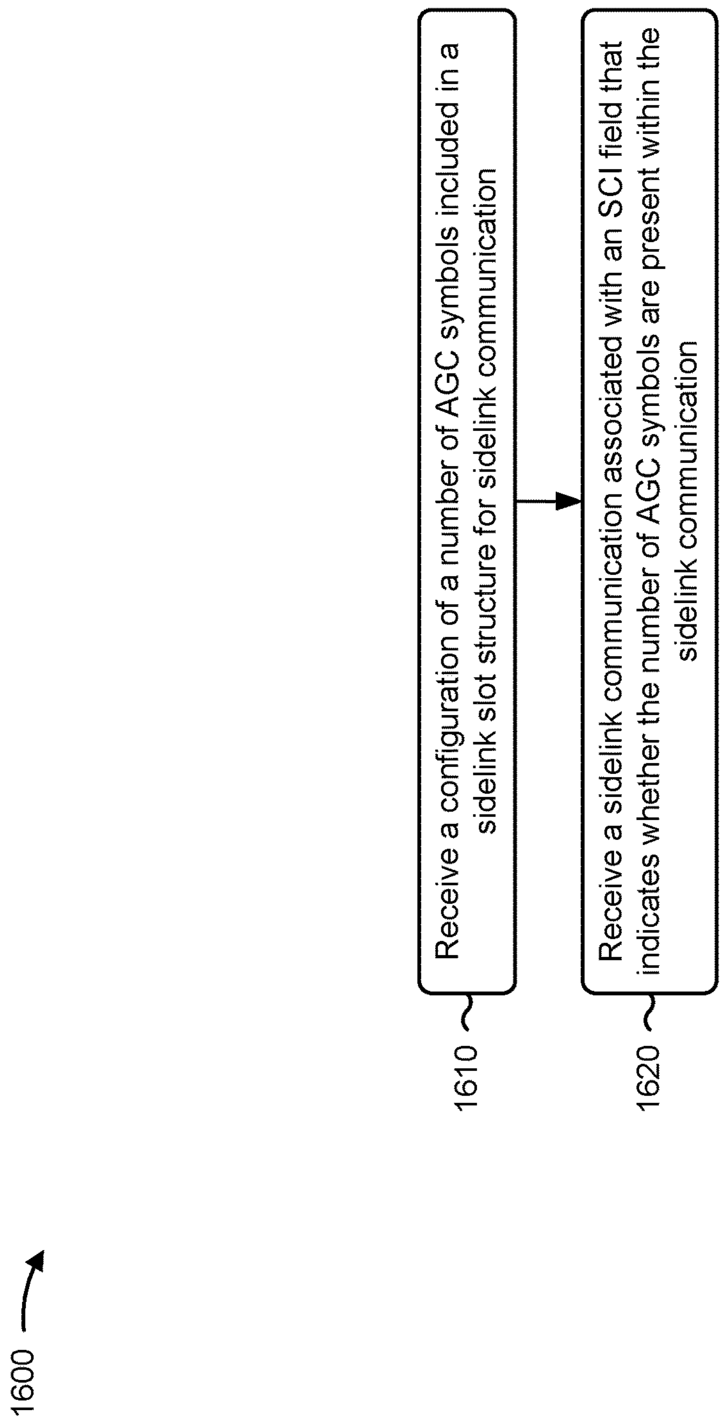
FIG. 16 is a diagram illustrating an example process performed, for example, by a UE, in accordance with the present disclosure.

FIG. 16 is a diagram illustrating an example process 1600 performed, for example, by a UE, in accordance with the present disclosure. Example process 1600 is an example where the UE (e.g., UE 120) performs operations associated with AGC symbols.

As shown in FIG. 16, in some aspects, process 1600 may include receiving a configuration of a number of AGC symbols included in a sidelink slot structure for sidelink communication (block 1610). For example, the UE (e.g., using reception component 1802 and/or communication manager 1806, depicted in FIG. 18) may receive a configuration of a number of AGC symbols included in a sidelink slot structure for sidelink communication, as described above.

As further shown in FIG. 16, in some aspects, process 1600 may include receiving a sidelink communication associated with an SCI field that indicates whether the number of AGC symbols are present within the sidelink communication (block 1620). For example, the UE (e.g., using reception component 1802 and/or communication manager 1806, depicted in FIG. 18) may receive a sidelink communication associated with an SCI field that indicates whether the number of AGC symbols are present within the sidelink communication, as described above.

Process 1600 may include additional aspects, such as any single aspect or any combination of aspects described below and/or in connection with one or more other processes described elsewhere herein.

In a first aspect, the AGC symbols are located before a PSCCH symbol, or the AGC symbols are located before a PSCCH symbol and before a PSFCH.

In a second aspect, alone or in combination with the first aspect, receiving the configuration of the number of AGC symbols comprises receiving the configuration from a network node.

In a third aspect, alone or in combination with one or more of the first and second aspects, process 1600 includes transmitting, to a network node, an indication of support of a minimum number of AGC symbols to use in the sidelink communication.

In a fourth aspect, alone or in combination with one or more of the first through third aspects, the configuration of the number of AGC symbols is associated with one or more of a set of slots that includes resources for the sidelink communication, or a sidelink BWP.

In a fifth aspect, alone or in combination with one or more of the first through fourth aspects, receiving the sidelink communication associated with the SCI field that indicates whether the number of AGC symbols are present within the sidelink communication comprises receiving a dynamic indication associated with the SCI field via a first SCI or a second SCI within the sidelink communication.

In a sixth aspect, alone or in combination with one or more of the first through fifth aspects, a time-domain DMRS pattern of the sidelink communication is independent from the SCI field that indicates whether the number of AGC symbols are present within the sidelink communication, or dependent on the SCI field that indicates whether the number of AGC symbols are present within the sidelink communication.

In a seventh aspect, alone or in combination with one or more of the first through sixth aspects, the SCI field indicates that AGC symbols are not present within the sidelink communication, and a transport block size of the sidelink communication is based at least in part on symbols available for data including one or more symbols that are configured for AGC, or symbols available for data excluding one or more symbols that are configured for AGC.

In an eighth aspect, alone or in combination with one or more of the first through seventh aspects, process 1600 includes applying an AGC gain to communications within a first AGC window, and applying an updated AGC gain to a second AGC window, the updated AGC gain being based at least in part on received signal strengths measured during the first AGC window.

In a ninth aspect, alone or in combination with one or more of the first through eighth aspects, process 1600 includes transmitting a request to an additional UE to transmit the sidelink communication without AGC symbols, and receiving an acknowledgement of the request from the additional UE.

In a tenth aspect, alone or in combination with one or more of the first through ninth aspects, the request is associated with a validity duration during which the UE supports an omission of AGC symbols.

In an eleventh aspect, alone or in combination with one or more of the first through tenth aspects, the validity duration has a value that is based at least in part on one or more of a configuration of the validity duration, a communication protocol, an indication from the UE, or an indication from an additional UE associated with transmission of the sidelink communication.

In a twelfth aspect, alone or in combination with one or more of the first through eleventh aspects, a set of sidelink communications that include the sidelink communication includes a set of one or more symbols allocated for AGC, and the set of one or more symbols allocated for AGC are used, within one or more sidelink communications of the set of sidelink communications, for one or more of AGC symbols, data symbols, or referencing signals.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
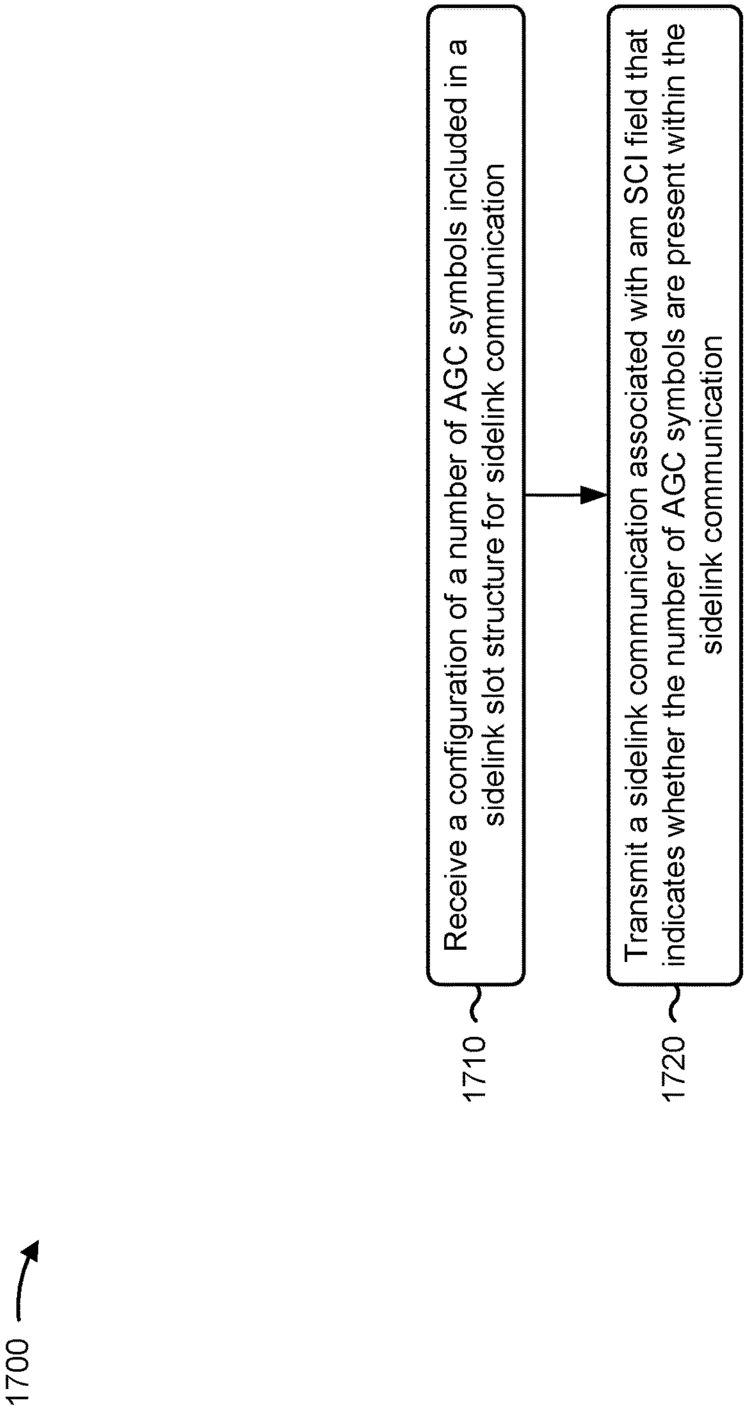
FIG. 17 is a diagram illustrating an example process performed, for example, by a UE, in accordance with the present disclosure.

FIG. 17 is a diagram illustrating an example process 1700 performed, for example, by a UE, in accordance with the present disclosure. Example process 1700 is an example where the UE (e.g., UE 120) performs operations associated with AGC symbols.

As shown in FIG. 17, in some aspects, process 1700 may include receiving a configuration of a number of AGC symbols included in a sidelink slot structure for sidelink communication (block 1710). For example, the UE (e.g., using reception component 1802 and/or communication manager 1806, depicted in FIG. 18) may receive a configuration of a number of AGC symbols included in a sidelink slot structure for sidelink communication, as described above.

As further shown in FIG. 17, in some aspects, process 1700 may include transmitting a sidelink communication associated with an SCI field that indicates whether the number of AGC symbols are present within the sidelink communication (block 1720). For example, the UE (e.g., using transmission component 1804 and/or communication manager 1806, depicted in FIG. 18) may transmit a sidelink communication associated with an SCI field that indicates whether the number of AGC symbols are present within the sidelink communication, as described above.

Process 1700 may include additional aspects, such as any single aspect or any combination of aspects described below and/or in connection with one or more other processes described elsewhere herein.

In a first aspect, the AGC symbols are located before a PSCCH symbol, or the AGC symbols are located before a PSCCH symbol and before a PSFCH.

In a second aspect, alone or in combination with the first aspect, receiving the configuration of the number of AGC symbols comprises receiving the configuration from a network node.

In a third aspect, alone or in combination with one or more of the first and second aspects, process 1700 includes transmitting, to a network node, an indication of support of a minimum number of AGC symbols to use in the sidelink communication.

In a fourth aspect, alone or in combination with one or more of the first through third aspects, the configuration of the number of AGC symbols is associated with one or more of a set of slots that includes resources for the sidelink communication, or a sidelink BWP.

In a fifth aspect, alone or in combination with one or more of the first through fourth aspects, transmitting the sidelink communication associated with the SCI field that indicates whether the number of AGC symbols are present within the sidelink communication comprises transmitting a dynamic indication associated with the SCI field via a first SCI or a second SCI.

In a sixth aspect, alone or in combination with one or more of the first through fifth aspects, a time-domain DMRS pattern of the sidelink communication is independent from the SCI field that indicates whether the number of AGC symbols are present within the sidelink communication, or dependent on the SCI field that indicates whether the number of AGC symbols are present within the sidelink communication.

In a seventh aspect, alone or in combination with one or more of the first through sixth aspects, the SCI field indicates that AGC symbols are not present within the sidelink communication, and a transport block size of the sidelink communication is based at least in part on symbols available for data including one or more symbols that are configured for AGC, or symbols available for data excluding one or more symbols that are configured for AGC.

In an eighth aspect, alone or in combination with one or more of the first through seventh aspects, process 1700 includes receiving a request from an additional UE to transmit the sidelink communication without AGC symbols, and transmitting an acknowledgement of the request from the additional UE.

In a ninth aspect, alone or in combination with one or more of the first through eighth aspects, the request is associated with a validity duration during which the additional UE supports an omission of AGC symbols.

In a tenth aspect, alone or in combination with one or more of the first through ninth aspects, the validity duration has a value that is based at least in part on one or more of a configuration of the validity duration, a communication protocol, an indication from the additional UE, or an indication from the UE.

In an eleventh aspect, alone or in combination with one or more of the first through tenth aspects, a set of sidelink communications that include the sidelink communication includes a set of one or more symbols allocated for AGC, and the set of one or more symbols allocated for AGC are used, within one or more sidelink communications of the set of sidelink communications, for one or more of AGC symbols, data symbols, or referencing signals.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
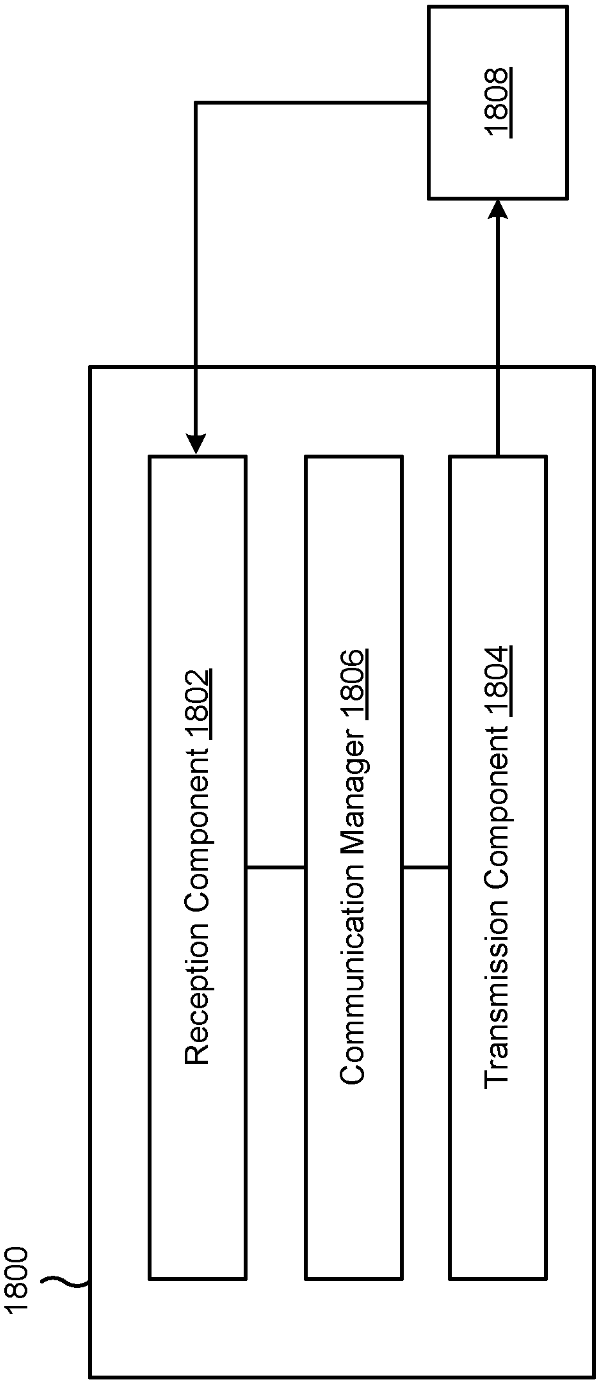
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a UE, or a UE may include the apparatus 1800. In some aspects, the apparatus 1800 includes a reception component 1802, a transmission component 1804, and/or a communication manager 1806, which may be in communication with one another (for example, via one or more buses and/or one or more other components). In some aspects, the communication manager 1806 is the communication manager 140 described in connection with FIG. 1. As shown, the apparatus 1800 may communicate with another apparatus 1808, such as a UE or a network node (such as a CU, a DU, an RU, or a base station), using the reception component 1802 and the transmission component 1804.

In some aspects, the apparatus 1800 may be configured to perform one or more operations described herein in connection with FIGS. 8-15. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1808. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the UE described in connection with FIG. 2.

The transmission component 1804 may transmit communications, such as reference signals, control information, data communications, or a combination thereof, to the apparatus 1808. In some aspects, one or more other components of the apparatus 1800 may generate communications and may provide the generated communications to the transmission component 1804 for transmission to the apparatus 1808. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1808. In some aspects, the transmission component 1804 may include one or more antennas, a modem, a modulator, a transmit MIMO processor, a transmit processor, a controller/processor, a memory, or a combination thereof, of the UE described in connection with FIG. 2. In some aspects, the transmission component 1804 may be co-located with the reception component 1802 in a transceiver.

The communication manager 1806 may support operations of the reception component 1802 and/or the transmission component 1804. For example, the communication manager 1806 may receive information associated with configuring reception of communications by the reception component 1802 and/or transmission of communications by the transmission component 1804. Additionally, or alternatively, the communication manager 1806 may generate and/or provide control information to the reception component 1802 and/or the transmission component 1804 to control reception and/or transmission of communications.

The reception component 1802 may receive a configuration of a number of AGC symbols included in a sidelink slot structure for sidelink communication. The reception component 1802 may receive a sidelink communication associated with an SCI field that indicates whether the number of AGC symbols are present within the sidelink communication.

The transmission component 1804 may transmit, to a network node, an indication of support of a minimum number of AGC symbols to use in the sidelink communication.

The communication manager 1806 may apply an AGC gain to communications within a first AGC window.

The communication manager 1806 may apply an updated AGC gain to a second AGC window, the updated AGC gain being based at least in part on received signal strengths measured during the first AGC window.

The transmission component 1804 may transmit a request to an additional UE to transmit the sidelink communication without AGC symbols.

The reception component 1802 may receive an acknowledgement of the request from the additional UE.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
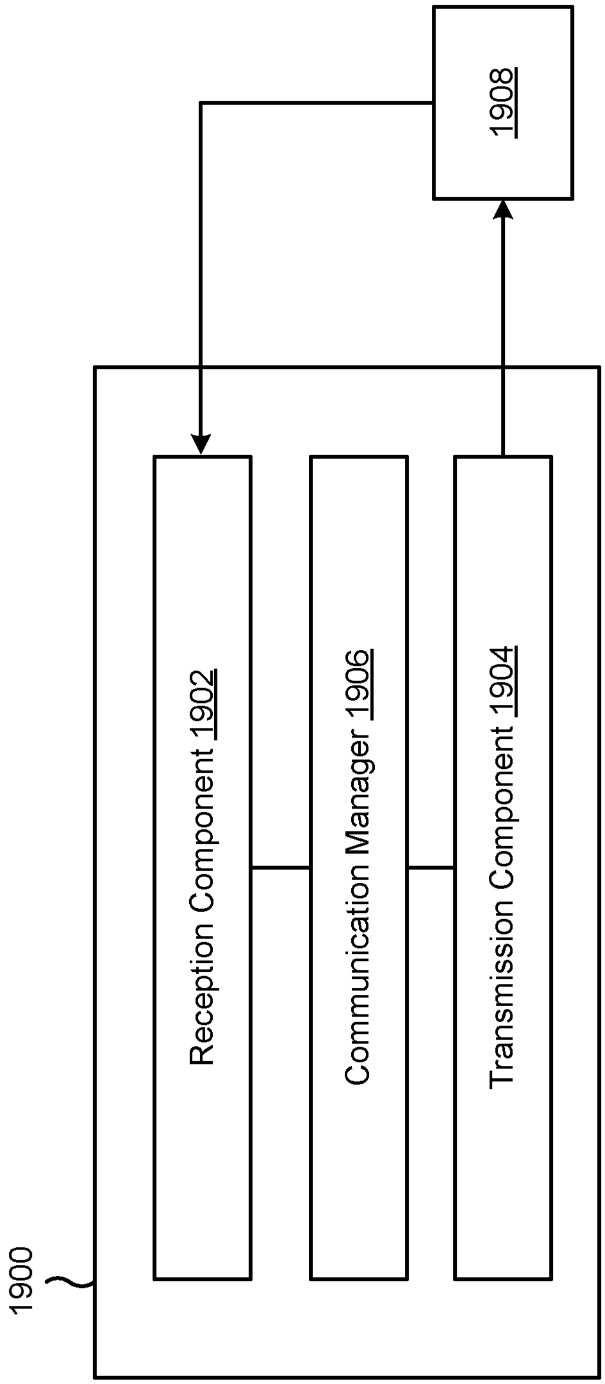
FIG. 19 is a diagram of an example apparatus for wireless communication, in accordance with the present disclosure.

FIG. 19 is a diagram of an example apparatus 1900 for wireless communication, in accordance with the present disclosure. The apparatus 1900 may be a UE, or a UE may include the apparatus 1900. In some aspects, the apparatus 1900 includes a reception component 1902, a transmission component 1904, and/or a communication manager 1906, which may be in communication with one another (for example, via one or more buses and/or one or more other components). In some aspects, the communication manager 1906 is the communication manager 140 described in connection with FIG. 1. As shown, the apparatus 1900 may communicate with another apparatus 1908, such as a UE or a network node (such as a CU, a DU, an RU, or a base station), using the reception component 1902 and the transmission component 1904.

In some aspects, the apparatus 1900 may be configured to perform one or more operations described herein in connection with FIGS. 8-17. Additionally, or alternatively, the apparatus 1900 may be configured to perform one or more processes described herein, such as process 1700 of FIG. 17. In some aspects, the apparatus 1900 and/or one or more components shown in FIG. 19 may include one or more components of the UE described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1908. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the UE described in connection with FIG. 2.

The transmission component 1904 may transmit communications, such as reference signals, control information, data communications, or a combination thereof, to the apparatus 1908. In some aspects, one or more other components of the apparatus 1900 may generate communications and may provide the generated communications to the transmission component 1904 for transmission to the apparatus 1908. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1908. In some aspects, the transmission component 1904 may include one or more antennas, a modem, a modulator, a transmit MIMO processor, a transmit processor, a controller/processor, a memory, or a combination thereof, of the UE described in connection with FIG. 2. In some aspects, the transmission component 1904 may be co-located with the reception component 1902 in a transceiver.

The communication manager 1906 may support operations of the reception component 1902 and/or the transmission component 1904. For example, the communication manager 1906 may receive information associated with configuring reception of communications by the reception component 1902 and/or transmission of communications by the transmission component 1904. Additionally, or alternatively, the communication manager 1906 may generate and/or provide control information to the reception component 1902 and/or the transmission component 1904 to control reception and/or transmission of communications.

The reception component 1902 may receive a configuration of a number of AGC symbols included in a sidelink slot structure for sidelink communication. The transmission component 1904 may transmit a sidelink communication associated with an SCI field that indicates whether the number of AGC symbols are present within the sidelink communication.

The transmission component 1904 may transmit, to a network node, an indication of support of a minimum number of AGC symbols to use in the sidelink communication.

The reception component 1902 may receive a request from an additional UE to transmit the sidelink communication without AGC symbols.

The transmission component 1904 may transmit an acknowledgement of the request from the additional UE.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some Aspects of the present disclosure:

Aspect 1: A method of wireless communication performed by a user equipment (UE), comprising: receiving a configuration of a number of automatic gain control (AGC) symbols included in a sidelink slot structure for sidelink communication; and receiving a sidelink communication associated with an SCI field that indicates whether the number of AGC symbols are present within the sidelink communication.

Aspect 2: The method of Aspect 1, wherein the AGC symbols are located before a physical sidelink control channel (PSCCH) symbol, or wherein the AGC symbols are located before a PSCCH symbol and before a physical sidelink feedback channel (PSFCH).

Aspect 3: The method of any of Aspects 1-2, wherein receiving the configuration of the number of AGC symbols comprises: receiving the configuration from a network node.

Aspect 4: The method of Aspect 3, further comprising: transmitting, to a network node, an indication of support of a minimum number of AGC symbols to use in the sidelink communication.

Aspect 5: The method of Aspect 3, wherein the configuration of the number of AGC symbols is associated with one or more of: a set of slots that includes resources for the sidelink communication, or a sidelink bandwidth part (BWP).

Aspect 6: The method of any of Aspects 1-5, wherein receiving the sidelink communication associated with the SCI field that indicates whether the number of AGC symbols are present within the sidelink communication comprises: receiving a dynamic indication associated with the SCI field via a first SCI or a second SCI within the sidelink communication.

Aspect 7: The method of Aspect 6, wherein a time-domain demodulation reference signal (DMRS) pattern of the sidelink communication is: independent from the SCI field that indicates whether the number of AGC symbols are present within the sidelink communication, or dependent on the SCI field that indicates whether the number of AGC symbols are present within the sidelink communication.

Aspect 8: The method of any of Aspects 1-7, wherein the SCI field indicates that AGC symbols are not present within the sidelink communication, and wherein a transport block size of the sidelink communication is based at least in part on: symbols available for data including one or more symbols that are configured for AGC, or symbols available for data excluding one or more symbols that are configured for AGC.

Aspect 9: The method of any of Aspects 1-8, further comprising: applying an AGC gain to communications within a first AGC window; and applying an updated AGC gain to a second AGC window, the updated AGC gain being based at least in part on received signal strengths measured during the first AGC window.

Aspect 10: The method of any of Aspects 1-9, further comprising: transmitting a request to an additional UE to transmit the sidelink communication without AGC symbols, and receiving an acknowledgement of the request from the additional UE.

Aspect 11: The method of Aspect 10, wherein the request is associated with a validity duration during which the UE supports an omission of AGC symbols.

Aspect 12: The method of Aspect 11, wherein the validity duration has a value that is based at least in part on one or more of: a configuration of the validity duration, a communication protocol, an indication from the UE, or an indication from an additional UE associated with transmission of the sidelink communication.

Aspect 13: The method of any of Aspects 1-12, wherein a set of sidelink communications that include the sidelink communication includes a set of one or more symbols allocated for AGC, and wherein the set of one or more symbols allocated for AGC are used, within one or more sidelink communications of the set of sidelink communications, for one or more of: AGC symbols, data symbols, or reference signals.

Aspect 14: A method of wireless communication performed by a user equipment (UE), comprising: receiving a configuration of a number of automatic gain control (AGC) symbols included in a sidelink slot structure for sidelink communication; and transmitting a sidelink communication associated with an SCI field that indicates whether the number of AGC symbols are present within the sidelink communication.

Aspect 15: The method of Aspect 14, wherein the AGC symbols are located before a physical sidelink control channel (PSCCH) symbol, or wherein the AGC symbols are located before a PSCCH symbol and before a physical sidelink feedback channel (PSFCH).

Aspect 16: The method of any of Aspects 14-15, wherein receiving the configuration of the number of AGC symbols comprises: receiving the configuration from a network node.

Aspect 17: The method of Aspect 16, further comprising: transmitting, to a network node, an indication of support of a minimum number of AGC symbols to use in the sidelink communication.

Aspect 18: The method of Aspect 16, wherein the configuration of the number of AGC symbols is associated with one or more of: a set of slots that includes resources for the sidelink communication, or a sidelink bandwidth part (BWP).

Aspect 19: The method of any of Aspects 14-18, wherein transmitting the sidelink communication associated with the SCI field that indicates whether the number of AGC symbols are present within the sidelink communication comprises: transmitting a dynamic indication associated with the SCI field via a first SCI or a second SCI.

Aspect 20: The method of Aspect 19, wherein a time-domain demodulation reference signal (DMRS) pattern of the sidelink communication is: independent from the SCI field that indicates whether the number of AGC symbols are present within the sidelink communication, or dependent on the SCI field that indicates whether the number of AGC symbols are present within the sidelink communication.

Aspect 21: The method of any of Aspects 14-20, wherein the SCI field indicates that AGC symbols are not present within the sidelink communication, and wherein a transport block size of the sidelink communication is based at least in part on: symbols available for data including one or more symbols that are configured for AGC, or symbols available for data excluding one or more symbols that are configured for AGC.

Aspect 22: The method of any of Aspects 14-21, further comprising: receiving a request from an additional UE to transmit the sidelink communication without AGC symbols, and transmitting an acknowledgement of the request from the additional UE.

Aspect 23: The method of Aspect 22, wherein the request is associated with a validity duration during which the additional UE supports an omission of AGC symbols.

Aspect 24: The method of Aspect 23, wherein the validity duration has a value that is based at least in part on one or more of: a configuration of the validity duration, a communication protocol, an indication from the additional UE, or an indication from the UE.

Aspect 25: The method of any of Aspects 14-24, wherein a set of sidelink communications that include the sidelink communication includes a set of one or more symbols allocated for AGC, and wherein the set of one or more symbols allocated for AGC are used, within one or more sidelink communications of the set of sidelink communications, for one or more of: AGC symbols, data symbols, or reference signals.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

at least one memory; and one or more processors, coupled to the at least one memory, configured to cause the UE to:

transmit, to a network node, an indication of support of a minimum number of automatic gain control (AGC) symbols to use in a sidelink communication;

receive, from the network node, a configuration of a number of AGC symbols included in a sidelink slot structure for the sidelink communication; and receive a sidelink communication associated with a sidelink control information (SCI) field that indicates whether the number of AGC symbols are present within the sidelink communication.

2. The UE of claim 1, wherein the AGC symbols are located before a physical sidelink control channel (PSCCH) symbol, or wherein the AGC symbols are located before a PSCCH symbol and before a physical sidelink feedback channel (PSFCH).

3. The UE of claim 1, wherein the configuration of the number of AGC symbols is associated with one or more of:

a set of slots that includes resources for the sidelink communication, or a sidelink bandwidth part (BWP).

4. The UE of claim 1, wherein the one or more processors, to receive the sidelink communication associated with the SCI field that indicates whether the number of AGC symbols are present within the sidelink communication, are configured to cause the UE to:

receive a dynamic indication associated with the SCI field via a first SCI or a second SCI within the sidelink communication.

5. The UE of claim 4, wherein a time-domain demodulation reference signal (DMRS) pattern of the sidelink communication is:

independent from the SCI field that indicates whether the number of AGC symbols are present within the sidelink communication, or dependent on the SCI field that indicates whether the number of AGC symbols are present within the sidelink communication.

6. The UE of claim 1, wherein the SCI field indicates that AGC symbols are not present within the sidelink communication, and wherein a transport block size of the sidelink communication is based at least in part on:

symbols available for data including one or more symbols that are configured for AGC, or symbols available for data excluding one or more symbols that are configured for AGC.

7. The UE of claim 1, wherein the one or more processors are further configured to cause the UE to:

apply an AGC gain to communications within a first AGC window; and apply an updated AGC gain to a second AGC window, the updated AGC gain being based at least in part on received signal strengths measured during the first AGC window.

8. The UE of claim 1, wherein the one or more processors are further configured to cause the UE to:

transmit a request to an additional UE to transmit the sidelink communication without AGC symbols, and receive an acknowledgement of the request from the additional UE.

9. The UE of claim 8, wherein the request is associated with a validity duration during which the UE supports an omission of AGC symbols.

10. The UE of claim 9, wherein the validity duration has a value that is based at least in part on one or more of:

a configuration of the validity duration, a communication protocol, an indication from the UE, or an indication from an additional UE associated with transmission of the sidelink communication.

11. The UE of claim 1, wherein a set of sidelink communications that include the sidelink communication includes a set of one or more symbols allocated for AGC, and wherein the set of one or more symbols allocated for AGC are used, within one or more sidelink communications of the set of sidelink communications, for one or more of:

AGC symbols, data symbols, or reference signals.

12. A user equipment (UE) for wireless communication, comprising:

at least one memory; and one or more processors, coupled to the at least one memory, configured to cause the UE to:

transmit, to a network node, an indication of support of a minimum number of automatic gain control (AGC) symbols to use in a sidelink communication receive, from the network node, a configuration of a number of AGC symbols included in a sidelink slot structure for the sidelink communication; and transmit a sidelink communication associated with a sidelink control information (SCI) field that indicates whether the number of AGC symbols are present within the sidelink communication.

13. The UE of claim 12, wherein the AGC symbols are located before a physical sidelink control channel (PSCCH) symbol, or wherein the AGC symbols are located before a PSCCH symbol and before a physical sidelink feedback channel (PSFCH).

14. The UE of claim 12, wherein the configuration of the number of AGC symbols is associated with one or more of:

a set of slots that includes resources for the sidelink communication, or a sidelink bandwidth part (BWP).

15. The UE of claim 12, wherein the one or more processors, to transmit the sidelink communication associated with the SCI field that indicates whether the number of AGC symbols are present within the sidelink communication, are configured to cause the UE to:

transmit a dynamic indication associated with the SCI field via a first SCI or a second SCI.

16. The UE of claim 15, wherein a time-domain demodulation reference signal (DMRS) pattern of the sidelink communication is:

independent from the SCI field that indicates whether the number of AGC symbols are present within the sidelink communication, or dependent on the SCI field that indicates whether the number of AGC symbols are present within the sidelink communication.

17. The UE of claim 12, wherein the SCI field indicates that AGC symbols are not present within the sidelink communication, and wherein a transport block size of the sidelink communication is based at least in part on:

symbols available for data including one or more symbols that are configured for AGC, or symbols available for data excluding one or more symbols that are configured for AGC.

18. The UE of claim 12, wherein the one or more processors are further configured to cause the UE to:

receive a request from an additional UE to transmit the sidelink communication without AGC symbols, and transmit an acknowledgement of the request from the additional UE.

19. The UE of claim 18, wherein the request is associated with a validity duration during which the additional UE supports an omission of AGC symbols.

20. The UE of claim 19, wherein the validity duration has a value that is based at least in part on one or more of:

a configuration of the validity duration, a communication protocol, an indication from the additional UE, or an indication from the UE.

21. The UE of claim 12, wherein a set of sidelink communications that include the sidelink communication includes a set of one or more symbols allocated for AGC, and wherein the set of one or more symbols allocated for AGC are used, within one or more sidelink communications of the set of sidelink communications, for one or more of:

AGC symbols, data symbols, or reference signals.

22. A method of wireless communication performed by a user equipment (UE), comprising:

transmitting, to a network node, an indication of support of a minimum number of automatic gain control (AGC) symbols to use in a sidelink communication;

receiving, from the network node, a configuration of a number of AGC symbols included in a sidelink slot structure for the sidelink communication; and receiving a sidelink communication associated with a sidelink control information (SCI) field that indicates whether the number of AGC symbols are present within the sidelink communication.

23. The method of claim 22, wherein a set of sidelink communications that include the sidelink communication includes a set of one or more symbols allocated for AGC, and wherein the set of one or more symbols allocated for AGC are used, within one or more sidelink communications of the set of sidelink communications, for one or more of:

AGC symbols, data symbols, or reference signals.

24. The method of claim 23, further comprising:

applying an AGC gain to communications within a first AGC window; and applying an updated AGC gain to a second AGC window, the updated AGC gain being based at least in part on received signal strengths measured during the first AGC window.

25. A method of wireless communication performed by a user equipment (UE), comprising:

transmitting, to a network node, an indication of support of a minimum number of automatic gain control (AGC) symbols to use in a sidelink communication;

receiving, from the network node, a configuration of a number of AGC symbols included in a sidelink slot structure for the sidelink communication; and transmitting a sidelink communication associated with a sidelink control information (SCI) field that indicates whether the number of AGC symbols are present within the sidelink communication.

26. The method of claim 25, wherein a set of sidelink communications that include the sidelink communication includes a set of one or more symbols allocated for AGC, and wherein the set of one or more symbols allocated for AGC are used, within one or more sidelink communications of the set of sidelink communications, for one or more of:

AGC symbols, data symbols, or reference signals.

* * * * *